US011239661B2

(12) United States Patent
Quitmann et al.

(10) Patent No.: US 11,239,661 B2
(45) Date of Patent: Feb. 1, 2022

(54) METHOD FOR FEEDING ELECTRICAL POWER INTO AN ELECTRICAL SUPPLY NETWORK

(71) Applicant: Wobben Properties GmbH, Aurich (DE)

(72) Inventors: Eckard Quitmann, Bremen (DE); Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/963,768

(22) PCT Filed: Jan. 22, 2019

(86) PCT No.: PCT/EP2019/051412
§ 371 (c)(1),
(2) Date: Jul. 21, 2020

(87) PCT Pub. No.: WO2019/149561
PCT Pub. Date: Aug. 8, 2019

(65) Prior Publication Data
US 2021/0044115 A1 Feb. 11, 2021

(30) Foreign Application Priority Data
Feb. 1, 2018 (DE) ...................... 10 2018 102 220.4

(51) Int. Cl.
*H02J 3/24* (2006.01)
*H02J 3/00* (2006.01)
(Continued)

(52) U.S. Cl.
CPC .............. *H02J 3/24* (2013.01); *G05B 19/042* (2013.01); *H02J 3/001* (2020.01); *H02J 3/18* (2013.01);
(Continued)

(58) Field of Classification Search
CPC ........ H02J 3/24; H02J 3/001; H02J 13/00002; H02J 3/18; H02J 2300/28; H02J 2300/24;
(Continued)

(56) References Cited

U.S. PATENT DOCUMENTS 10,683,846 B2 6/2020 Brombach et al.
2012/0292904 A1* 11/2012 Tarnowski .............. H02J 3/381
290/44

(Continued)

FOREIGN PATENT DOCUMENTS

DE 102016115431 A1 2/2018

OTHER PUBLICATIONS

U.S. Appl. No. 16/966,739, filed Jul. 31, 2020, Method for Feeding Electrical Power Into an Electrical Supply Network.
(Continued)

*Primary Examiner* — Ziaul Karim
(74) *Attorney, Agent, or Firm* — Seed IP Law Group LLP

(57) ABSTRACT

Provided is a method for exchanging electric power with an electricity supply grid that has a grid frequency using a converter-controlled generation unit that may be a wind power installation or a wind farm, at a grid connection point. The method includes exchanging electric power depending on a control function. The electric power includes active and reactive power and the control function controls the power depending on at least one state variable of the electricity supply grid. It is possible to switch between a normal control function and a support control function, different from the normal control function, as the control function. The normal control function is used when it has been recognized that the electricity supply grid is operating stably and the support control function is used when a grid fault or an end of the grid fault has been recognized.

15 Claims, 8 Drawing Sheets

(51) Int. Cl.
*H02J 13/00* (2006.01)
*G05B 19/042* (2006.01)
*H02J 3/18* (2006.01)
*H02J 3/38* (2006.01)

(52) U.S. Cl.
CPC .............................. *H02J 13/00002* (2020.01); *G05B 2219/2619* (2013.01); *G05B 2219/2639* (2013.01); *H02J 3/381* (2013.01); *H02J 2300/24* (2020.01); *H02J 2300/28* (2020.01)

(58) Field of Classification Search
CPC ...... H02J 3/381; H02J 3/40; H02J 3/48; H02J 3/50; H02J 2300/10; G05B 19/042; G05B 2219/2619; G05B 2219/2639; Y02E 10/76; Y02E 10/56
See application file for complete search history.

(56) References Cited

U.S. PATENT DOCUMENTS

| 2015/0088326 | A1* | 3/2015 | Fortmann | F03D 7/048 |
| | | | | 700/287 |
| 2015/0137520 | A1* | 5/2015 | Garcia | F03D 7/0284 |
| | | | | 290/44 |
| 2015/0198145 | A1* | 7/2015 | Diedrichs | F03D 9/257 |
| | | | | 700/287 |
| 2017/0250540 | A1* | 8/2017 | Varma | H02M 7/44 |

OTHER PUBLICATIONS

Fu et al., "Damping Control of PMSG-Based Wind Turbines for Power System Stability Enhancement", Renewable Power Generation Conference (RPG 2013), Beijing, 2013, pp. 1-4.

\* cited by examiner

METHOD FOR FEEDING ELECTRICAL POWER INTO AN ELECTRICAL SUPPLY NETWORK

BACKGROUND

Technical Field

The present invention relates to a method for exchanging electric power with an electricity supply grid. The present invention relates in particular to a method for exchanging electric power between a wind power installation or a wind farm and an electricity supply grid. The present invention furthermore relates to a corresponding wind power installation or to a corresponding wind farm.

Description of the Related Art

The exchange of electric power essentially concerns the infeed of electric power, but since reactive power in particular is able not only to be fed in but also to be drawn, depending on the situation, what is thus provided is also a method and a device for exchanging electric power. Active power may however also in principle be drawn from the electricity supply grid.

It is known to use a wind power installation to feed electric power into an electricity supply grid. The wind power installation is usually targeted to a grid frequency in the electricity supply grid, and the same also applies in principle to a wind farm having a plurality of wind power installations. Such a grid frequency is usually predefined and supported by large-scale power plants. Such large-scale power plants have directly coupled synchronous generators for this purpose. This means that these synchronous generators, or at least one of them, are electrically connected directly to the electricity supply grid. The frequency in the electricity supply grid then results directly from the speed of the synchronous generator.

In this respect, these generators, which have a large moment of inertia, may predefine a comparatively stable grid frequency. If however a voltage dip occurs in the grid, specifically in the case of a grid fault, these directly coupled synchronous generators may thereby begin oscillating, in particular as a result of further feedback with the electricity supply grid. Such a voltage dip may in particular cause a phase jump. Following the voltage dip, the average pole wheel angle may then shift forward since the machine, that is to say the synchronous generator, was not able to deliver the full active power into the grid during the voltage dip. In principle, however, other faults may also lead to such unwanted excitation or other unwanted excitation of the directly coupled synchronous generators.

Such directly coupled synchronous generators, which may also be referred to as synchronous machines, may also be put into oscillation by a sudden parallel infeed of active power, since the operating characteristic curve of the synchronous generator suddenly changes accordingly due to such a sudden parallel infeed of active power. If such excess energy is not dissipated quickly enough again at the synchronous generator, the synchronous generator may possibly not return, or not return quickly enough, to its normal operating state. There is also the risk of said different oscillatory excitations overlapping to such an extent that they disrupt the synchronous generator.

Such behavior of a synchronous generator or of a plurality of synchronous generators correspondingly coupled directly to the electricity supply grid is also noticeable in the grid, for example in the form of frequency oscillations. In the most extreme case, the synchronous generator being disrupted may also lead to breakdown of the electricity supply grid when such a situation is not able to be absorbed by a sufficient number of other generators in the electricity supply grid.

Decentralized generators, such as for example wind power installations, may also in this case contribute to stabilizing the electricity supply grid. Such decentralized generators, which feed into the electricity supply grid by way of a frequency converter, be this then directly through a full converter concept or using a doubly fed asynchronous machine, are usually able to respond immediately to grid problems and for example, in the case of a frequency drop, immediately adapt the power fed into the electricity supply grid at least in the short term. As a result, such decentralized generators, for which wind power installations are mentioned below by way of representation, may achieve rapid grid support. Such grid support may turn out to be all the more effective the more wind power installations or other decentralized generators feed into the electricity supply grid.

At the same time, however, there is the inherent risk of specifically such rapidly fed-in supportive power also possibly causing additional oscillatory excitation of a directly coupled synchronous generator. In the most extreme case, such an infeed of active power, depending on the boundary conditions, could even lead to disruption of such a synchronous generator. However, even without such an extreme consequence, oscillatory excitation of a synchronous generator by decentralized generators is undesirable.

In the priority application for the present PCT application, the German Patent and Trade Mark Office searched the following prior art: DE 10 2016 115 431 A1 and Fu, Y. et al. "Damping control of PMSG-based wind turbines for power system stability enhancement" In: 2nd I ET Renewable Power Generation Conference (RPG 2013), Beijing, 2013.

BRIEF SUMMARY

Oscillatory excitation of a synchronous generator, in particular following a grid fault, is avoided or is even reduced or additionally reduced when it occurs.

A method is proposed. This method concerns a method for exchanging electric power with an electricity supply grid that has a grid frequency by way of a converter-controlled generation unit, in particular a wind power installation, at a grid connection point. It should be noted that a converter-controlled generation unit may also be referred to synonymously as a converter-controlled feeder. The converter-controlled generation unit, which may be designed as a wind power installation or else as a wind farm, thus exchanges power with the electricity supply grid.

This exchange initially takes place such that the electric power is exchanged depending on a control function, wherein the electric power may comprise active and reactive power.

The control function controls the power depending on at least one state variable of the electricity supply grid. The power is in particular controlled depending on a grid voltage and/or a grid frequency. The grid voltage or the grid frequency thus each form a possible state variable. Here in particular, the active power is controlled depending on a grid frequency, and the reactive power is controlled depending on a grid voltage.

It is possible to switch between a normal control function and a support control function, different from the normal control function, as control function. There are thus different control functions available, in particular a normal control function and a support control function. The support control function may however for its part in particular be changeable and/or be selected from different potential support control functions according to need.

The normal control function is used when it has been recognized that the electricity supply grid is operating stably. This usually concerns the normal case in which specifically there is in particular no grid fault or no grid interference. Small deviations in particular in the grid voltage from a nominal value for the grid voltage and in the grid frequency from a nominal value of the grid frequency may occur without a grid fault having to be assumed. The normal function in particular performs control operations depending on these values as well, such that this normal control function is also active in the case of at least relatively small changes.

If however a grid fault or an end of such a grid fault has been recognized, the support control function is used. For the support control function, there is provision for this to control fed-in power, that is to say overall the exchanged power, such that it is possible to counteract an oscillation in the electricity supply grid, that is to say an oscillation is thus counteracted. There is in particular provision for a support control function that is able to counteract an oscillation of a synchronous generator connected in the electricity supply grid or an oscillation caused by the synchronous generator.

The proposed method is based in particular on the concept that a grid fault or the end of a grid fault may trigger an oscillation in the electricity supply grid. This may be caused in particular by one or more synchronous generators connected directly to the electricity supply grid. To this end, it is proposed to adapt the support control function especially for this purpose. As long as the electricity supply grid is operating without any faults, such a special support control function is not required and the normal control function may be used. If however the grid fault occurs or if the grid fault ends, then it is important to respond very quickly in the correct manner. It is thus important for the infeed into the electricity supply grid to take place using a suitable control function, wherein such a suitable control function should also be available as quickly as possible. To this end, what is proposed is the support control function that is already tailored to such a situation, specifically the grid fault or the end thereof, and at the same time is also prepared for a situation in which said oscillations are expected. By using this support control function, previously preset parameters and/or characteristics may be selected specifically for such a situation. These preset parameters or characteristics are provided by the proposed support control function, and this then needs to be used only in the event of the grid fault or at the end of the grid fault.

Such preset parameters concern in particular gradients of ramps or partial ramps at which a reactive power and/or an active power are increased again following the fault. This may also take place in increments. In this case, this said ramping up of active power and reactive power also may be matched with one another. This support control function may in particular store the fact that one of the two powers, active power and reactive power, should be ramped back up more quickly.

The support control function may also contain a delay with a defined ramp. It is thereby able to be taken into account that, immediately following the fault, a synchronous machine coupled to the electricity supply grid is shifted forward by a certain pole wheel angle, and as long as stability reserves are not exceeded, this synchronous machine would begin to accelerate back following the voltage recovery. If this situation occurs, wind farms that are connected to the electricity supply grid in the vicinity of this synchronous machine may behave critically in particular in two ways when they are not controlled according to the invention:

In one way, they perform a very fast power recovery by rapidly increasing the active power, and an increase in the reactive power that is not suitable for the situation is possibly furthermore also performed. This may be particularly inexpedient when the pole wheel angle of the synchronous machine is still at a maximum. Such behavior of the wind farms, or of an individual wind farm, would lead to the stability reserve of the synchronous machine being reduced immediately following the fault and the synchronous machine would then not be able to oscillate back in a defined manner and would stabilize to a worse extent or not at all.

In another way, the wind farms, or a wind farm, may perform a power recovery while the synchronous machine, in a procedure with renewed backward oscillation, has an excessively large pole wheel angle, which commences immediately after reaching the lower vertex. In such a situation, the machine not only accelerates in accordance with its energy stored in the magnetic field, but is also additionally pushed in this direction by the power recovery of the at least one wind farm.

The problems with both explained ways may be countered in particular by a ramp. This however involves predefining the ramp in a correct manner. It is in particular proposed for the ramp either to start immediately following the voltage recovery or to first wait for a whole oscillation period. It is proposed to perform the power increase only during the return oscillation back to the smaller pole wheel angle. The support control function may however also store special characteristics regarding the assumed voltage at the end of the grid fault in order only then to control for example ramping up of active power and/or reactive power. A strategy in particular of ramping up active power and reactive power may also be implemented in the support control function, such as for example ramping up in increments, in particular with ramps and pauses in between them, in which the respective active and/or reactive power value is retained for a predefined duration. Such parameters and/or characteristics may also take into account the oscillations to be specifically expected or the characteristics that bring these about of the electricity supply grid.

It has in particular been recognized that in this case, depending on a large number of conditions, consideration may be given to a complex strategy that is however able to be provided by a correspondingly preset support control function. It may then in particular also be used ad hoc in the case of the grid fault or the end thereof, if it is then used instead of the normal control function.

It is preferably proposed for the at least one support control function to be provided for control in post-fault behavior, wherein post-fault behavior denotes behavior of the electricity supply grid immediately following the grid fault. The post-fault behavior in particular here denotes a voltage recovery at the grid connection point following a significant voltage dip at the grid connection point.

A significant voltage dip is a dip in the grid voltage by at least 50% with respect to the grid nominal voltage and/or with respect to the grid voltage prior to the voltage dip.

It has in particular been recognized and taken into account here that the grid fault as such does not necessarily require the use of a support control function, and should possibly be taken into account in accordance with completely dedicated specifications. What is known as fault ride-through may be of particular importance here. If the fault, that is to say this voltage dip, is ridden through, it is then particularly important to return to a stable and then as far as possible also normal operating point. It is in particular also important, in the case of using a wind power installation, to bring this back to an operating point at which it feeds in the power available from the wind in a stable manner.

The path from the end of the grid fault to this at least stable operating point may be referred to here as the post-fault behavior. The support control function that is then used is designed in particular for this procedure, specifically the post-fault behavior.

According to one refinement, it is proposed for the support control function to be designed to counteract an oscillation that is brought about by a response of at least one synchronous generator, coupled directly to the electricity supply grid, to the grid fault or the end of the grid fault. This embodiment in particular concentrates on the fact that a synchronous generator coupled directly to the electricity supply grid responds to the grid fault or the end of the grid fault with an oscillation. The support control function is designed for this oscillation or this behavior of the synchronous generator and it is thereby able to counteract such an oscillation when the support control function is used.

A plurality of predefined functions are preferably stored, in particular in a controller of the wind power installation or of the wind farm, and the support control function is able to be selected from this plurality of stored predefined functions. Each stored predefined function thus on its own forms a support control function, and in this sense each predefined function may be tailored to particular circumstances as support control function. Depending on the situation, a selection is then made between one of the stored predefined functions, and the selected predefined function then forms the support control function to be used.

This selection may also be made before the grid fault occurs. It is thus possible to select a support control function that appears to be suitable at the time from a plurality of stored predefined functions before a grid fault occurs. If no grid fault then occurs, the selected support control function will in this respect also not be used and it may then be the case, that is to say before a grid fault has even occurred, that a new situation would appear to make another predefined function advisable as support control function. Another support control function is then thus again selected. A support control function selected from a plurality of predefined functions is then thus available each time and may be used immediately in the event of the grid fault or at the end of the grid fault. It however in principle also comes into consideration for the support control function to be selected from the predefined functions at all only when the grid fault occurs or at the end of the grid fault. It is however often advisable already to select the support control function early, in order that no time is wasted by selecting the support control function in the event of the grid fault or at the end thereof.

It is in particular also proposed for the support control function not to be selected depending on specific properties of the grid fault, but rather depending on properties of the electricity supply grid. In this case, properties describe the electricity supply grid as such and a distinction is drawn between states, such as grid voltage or grid frequency. Such properties of the electricity supply grid are usually present over the relatively long term and therefore allow the support control function to be selected as a precautionary selection. A grid sensitivity or a short-circuit current ratio at the grid connection point. In this case, a grid sensitivity for a grid connection point describes the ratio of a voltage change in response to a change in the power fed in at the grid connection point. A short-circuit current ratio describes the ratio of a short-circuit current able to be supplied by the electricity supply grid at a grid connection point of a feeder to the nominal power of the feeder.

The support control function is selected in particular depending on a selection signal that is received externally. An operator of the electricity supply grid, referred to as grid operator for the sake of simplification, may in particular thereby influence the selection of the support control function, in particular specifically predefine or request it. This is based in particular on the concept that the grid operator correctly recognizes the specific situation, that is to say the specific property of its electricity supply grid, and is therefore also able to predefine a behavior for the fault case or post-fault case by predefining the desired support control function. Due to the fact that the predefined functions are stored, they are able to be selected by way of a very simple signal: Thus, if for example four predefined functions are stored, from which the support control function is able to be chosen, the grid operator, by way of illustration and as an example, may make the selection through a simple 2-bit signal. This accordingly requires a low bandwidth, which otherwise also often allows a higher safety standard to be implemented.

It is preferably proposed, in addition or as an alternative, for the support control function to be selected depending on topology information or topology properties of the electricity supply grid. The electricity supply grid may in particular be identified to a good level with regard to its instantaneous properties using such topology information or properties.

Such topology information may be one or more switch positions in the electricity supply grid. This concerns in particular switch positions of grid disconnection switches that are intended to disconnect or connect grid sections of the electricity supply grid. It is able to be recognized, in particular using such switches or their switch positions, what kind of consumers and what kind of generators are connected to the grid section that is being fed into. In particular, an open grid disconnection switch may mean for example that a synchronous generator coupled directly to the electricity supply grid is however no longer coupled to the grid section that is being fed into, specifically because this open grid disconnection switch is in between them. It would then be necessary to select a support control function that is not targeted at this directly coupled synchronous generator, since this is not reachable for this support control function at this time. Another support control function may accordingly also be selected again when said grid disconnection switch is closed again. It is then advisable for the support control function to take into account the directly coupled synchronous generator, which is now relevant, in its behavior.

Furthermore or as an alternative, the topology information may contain information about connected generator units. In particular information about dominant types of generator units in the electricity supply grid, specifically in particular information about synchronous generators coupled directly to the electricity supply grid. Large-scale power plants are in particular in this respect dominant types of generator units, and these also have correspondingly large synchronous generators coupled directly to the electricity supply grid. Exactly such large synchronous generators coupled directly to the electricity supply grid may cause an oscillation following a grid fault. It is accordingly proposed to take this information into account as topology information and to select the support control function depending thereon.

According to one embodiment, as an alternative or in addition, it is proposed for the support control function to be selected depending on an evaluation result of predetermined evaluation logic. This is based here in particular on the concept that the support control function should be selected in this way not only automatically, but rather also in an easily comprehensible and also easily reproducible manner. It is proposed to use evaluation logic for this purpose. Such evaluation logic may for example take into account said switch positions. By way of example, depending on the switch position of a first switch, one group of predefined functions may be excluded as support control function and another may be narrowed down. Depending on further information, for example about connected generator units, a smaller group or even the specific predefined function may then be selected from the narrowed-down group.

According to a further refinement, it is proposed for the support control function to be settable. The support control function may thereby also be adapted to corresponding circumstances. As a result, the setting of the support control function makes it possible to achieve that which has also been described above in connection with the selection of a support control function from a plurality of predefined functions. As a result of the setting, there are in this case in principle more setting options or more degrees of freedom than in the case of selecting from a plurality of predefined functions. This advantage is however accompanied by the fact that the setting may also be more complex in terms of implementation and a selection from a plurality of predefined functions may possibly be clearer and better reproducible.

It is in particular proposed for the support control function to be able to be set externally via a data interface. This in particular provides the option here of a grid operator being able to set the support control function.

Furthermore or as an alternative, it is proposed for the support control function to be transmitted externally. The support control function may thus be selected due to the fact that the support control function to be selected is transmitted externally. A support control function that appears to be expedient to a grid operator may thus be selected externally, that is to say in particular by said grid operator, and then transmitted for use. The use however also takes place only when a grid fault or the end of a grid fault occurs. It also comes into consideration here in principle for the support control function to be transmitted only upon the grid fault or at the end of the grid fault, that is to say when the support control function should be used instead of a normal control function. The correct support control function is thereby always able to be provided and used ad hoc, but there is the risk of too much time being wasted in this case.

The support control function is preferably set by setting parameters of the support control function. Such parameters are in particular a gradient of a reactive power ramp and/or a gradient of an active power ramp that respectively specify the extent to which the active power or reactive power increases following the grid fault or the end of the grid fault. The parameters may also each specify the beginning of a ramp, in particular with respect to the end of the grid fault.

The support control function is also preferably set depending on topology information. The explanations that have been given in this summary regarding the selection of a support control function from a predefined function depending on topology information should likewise be applied analogously here.

A converter saturation is preferably determined. The converter saturation is a measure of the proportion of power that is fed in by converter-controlled feeders to power fed in by synchronous machines coupled directly to the electricity supply grid. It has in particular been recognized here that these two different feeders may also differ significantly in terms of their behavior. It has in particular also been recognized that in particular an increase in renewable energy generators and therefore energy feeders increases the proportion of such feeders that feed into the electricity supply grid through converters. A converter-controlled feeder is in particular a wind power installation or even a wind farm, wherein the infeed takes place by way of at least one converter, that is to say a frequency inverter, which feeds the power in directly by specifying in particular a current signal as a function of frequency and phase, or a voltage signal. It also comes into consideration for such a converter not to feed directly into the electricity supply grid or to directly feed into it only in part, but rather at least in part to feed in power by driving what is known as a doubly fed asynchronous machine.

In any case, such converter-controlled feeders differ from synchronous machines coupled directly to the electricity supply grid in that they are able to respond very quickly and very flexibly and are in particular able to be controlled well by a microprocessor and are thereby able to adapt their infeed signal to specifications in a highly targeted manner. In contrast thereto, the property of the feeder by way of synchronous generators coupled directly to the electricity supply grid also depends to a considerable extent on the physical properties thereof. In this respect, directly coupled synchronous generators tend more toward oscillations and are in this case harder to influence in terms of control than is the case with converter-controlled feeders. Response properties, also outlined at the outset and also outlined further on, of directly coupled synchronous generators to grid faults or the end thereof thus do not occur in the case of converter-controlled feeders.

It has been recognized on the basis of this that converter saturation may be a significant property of the electricity supply grid that also has effects on a fault behavior or post-fault behavior, and precisely this may be taken in account through correspondingly tailored support control functions. In this case, the converter saturation may concern the electricity supply grid that is fed into, or it may concern a subsection of the electricity supply grid, or it may also concern a nearby region defined around the grid connection point that is fed into. It may also in particular be expedient to take into account a converter saturation, for example in a section of the European integrated grid. The European integrated grid, making further use of this example, is specifically very large, and a converter-controlled feeder that feeds in for example in Denmark will often have less influence on a behavior in Spain, but at the same time a converter saturation may have a regional influence. In particular an oscillation procedure that is taken into account here may also occur in a subsection of the supply grid or in a nearby region, even without this subsection or this nearby region having to be disconnected from the rest of the electricity supply grid, that is to say in this example the European integrated grid.

In particular however when a small electricity supply grid is present, such as for example an island grid, then the converter saturation may also concern the entire electricity supply grid. Such a situation could be the case for example for an electricity supply grid of the size of the Irish electricity supply grid or for smaller electricity supply grids.

It is thus proposed to set or select the support control function depending on the determined converter saturation. In this case too, all of the ways of setting or selecting the support control function already described come into consideration.

In the case of a high converter saturation, it should in particular be taken into account firstly that a lower susceptibility to oscillations of the electricity supply grid should be expected, but secondly that it should also be expected that the remaining, specifically a large number of converter-controlled feeders themselves may possibly all counteract an oscillation in the event of a determined high converter saturation. It should thus be taken into account that there are many other converter-controlled feeders that attempt to counter-control any oscillations. It is accordingly proposed for this to be incorporated into the consideration such that an excess control response is avoided.

According to one embodiment, it is proposed for the method to be characterized in that a support control function controls an active power component and a reactive power component, in particular in that an active power function and a reactive power function are provided for this purpose. The active power function and the reactive power function may be combined in the support control function. They may in particular together form the support control function.

The active power component is in this case intended to achieve a first support task, in particular to achieve frequency support. The reactive power component is intended to achieve a second support task, in particular to achieve voltage support. To this end, it is then proposed, for the selection or the setting of the support control function, for the first support task and the second support task to be prioritized depending on the determined converter saturation. Depending on converter saturation, the first or second support task is thus prioritized to a greater extent. The active power function or reactive power function then in particular accordingly has a correspondingly greater proportion of the support control function.

It is in particular proposed for a ratio of the active power component to the reactive power component and/or a ratio of an increase in the active power component to an increase in the reactive power component to be selected depending on the determined converter saturation. In a balanced case, the active power component and the reactive power component may thus be the same, and this thus gives a ratio of 1. Or, in a compensated case, the rise in the active power component may be the same as the rise in the reactive power component. This should however then be selected depending on the determined converter saturation. It is in particular proposed for the active power component or its rise to be greater than the reactive power component or its rise the greater the determined converter saturation.

According to one embodiment, it is proposed for the reactive power to be reduced from a reactive power value during the grid fault, if feeding-in continues to be performed in spite of the grid fault, in particular in what is known as an FRT (fault ride-through) case, to a new reactive power value. It is in particular taken into account here that the reactive power is controlled to the new reactive power value by way of a ramp function, in particular that it is reduced to the new reactive power value. This new reactive power value may then be considered to be a post-fault operating point or form part thereof.

In the event of a high converter saturation, it is thus proposed for the active power component or its rise to be particularly large. This may also mean that the active power function is then particularly large in comparison with the reactive power function.

This is in this case in particular a post-fault behavior in which active power and reactive power are ramped up following the fault in particular by ramps that may however also have interruptions. If the converter saturation is then large, that is to say if there is a high proportion of converter-controlled feeders in the electricity supply grid, it is thus proposed, in any case according to one embodiment, to ramp up the active power more quickly than the reactive power. In the event of a low converter proportion, that is to say in the event of a low converter saturation, this may be reversed. Such a comparison may in each case be oriented in particular toward nominal values, that is to say toward the nominal active power or nominal reactive power. These may have the same value, wherein only the units differ formally as it were, the active power is thus given in kW or MW, whereas the reactive power is accordingly given in kVAr or MVAr. These values are however comparable in this respect. Due to this comparability of the values, it is also proposed for said ratios of active power component to reactive power component to concern absolute values.

The proposed prioritization is in particular based on the concept that, in the case of a high converter saturation following a grid fault, few oscillation effects caused by directly coupled synchronous generators should be expected. At the same time, however, a low supply of active power to the electricity supply grid by such directly coupled synchronous generators should also be expected. Accordingly, as much active power as possible should be fed in by the converter-controlled feeders, in particular the wind power installation or the wind farm, or this active power should be fed in as quickly as possible. In the case of such a high dominance of converters, an upswing in the electricity supply grid would also not be expected, since in this case the proportion of active power fed in by converter-controlled feeders is also dominant.

Local oscillations may however occur. However, in the case of a high converter saturation, it is proposed here to take into consideration the fact that one or more directly coupled synchronous machines may be disconnected from the electricity supply grid. It has been recognized that it may be more important, due to the low overall inertia, to quickly bring the power to a high value than to keep as far as possible all synchronous machines on the grid. It is preferably proposed to perform continually slower ramping up to around 50% to 70%, in particular 60% converter saturation. At a higher converter saturation of up to 100%, it is proposed for the active power to be ramped up more quickly, preferably the more quickly the higher the converter saturation.

If however the converter saturation is low, then the correspondingly large number of directly coupled synchronous generators may exhibit an oscillation problem, but a large amount of active power may also contribute to restoring or to restabilizing the electricity supply grid.

It has been recognized that, when the converter saturation is low, the converter-controlled generation units do not tend to manage to excite the large number of remaining synchronous machines to oscillate. It is therefore proposed, with increasing converter saturation, in particular up to around 50% to 70%, in particular around 60%, for the power to be increased more slowly than at a higher converter saturation, when the overall inertia of the relevant synchronous generators is small.

By feeding in a large amount of reactive power, it is possible to achieve grid stabilization, which prevents an upswing. The active power is to this end accordingly fed in or ramped up to a lesser extent or more slowly. Precisely this is also however possible more easily, since the large number of directly coupled synchronous generators themselves are already able to achieve a high active power component in the electricity supply grid following the grid fault.

A converter saturation or a converter proportion in the electricity supply grid preferably concerns the active power able to be fed in in each case. This thus does not involve comparing the directly coupled synchronous generators with the converter-controlled feeders in terms of numbers, but rather the active power able to be fed in by both groups is preferably used as reference variable.

The method is preferably characterized in that the support control function specifies or predefines at least one of the following relationships or one of the following properties:

A temporal profile of the active power to be fed in or to be additionally fed in. This is thus used in particular to control the ramping up of the active power, and the support control function specifies how this should be done.

A temporal profile of a voltage to be impressed. This may in particular be used to achieve a voltage impression that is however not only particularly advantageous when a high converter saturation is present and directly coupled synchronous generators are not able to achieve voltage support to a sufficient extent.

A relationship between a recorded grid voltage or grid voltage change and a reactive power to be fed in or to be additionally fed in or a reactive current to be fed in or to be additionally fed in. In this case, the support control function basically predefines a voltage-dependent reactive power infeed and this may be set accordingly depending on the situation, in particular also depending on grid topology. Such a relationship may in particular be considered to be a gain or gain factor and this gain or gain factor may be selected and set depending on the situation.

A temporal profile of a reactive power to be fed in or to be additionally fed in or of a reactive current to be fed in or to be additionally fed in. In this case, the reactive power or the reactive current, in particular its increase following the grid fault, is not or not only set depending on a grid voltage, but rather via a time function. This may in particular include a reactive power ramp or reactive current ramp that specifies how the reactive power or the reactive current is increased over time, in order then to achieve an operating point that is as stable as possible again following the grid fault.

A temporal increase in an active power to be fed in or an active current to be fed in, in particular using a ramp function with a predetermined gradient or using a plurality of combined ramp functions with different gradients or using a predetermined trajectory. A starting dead time may preferably also be taken into account or set, this first of all having to elapse before the active power is increased. This starting dead time may also be part of the predetermined trajectory. This is in particular used to control the ramping up of the active power following a grid fault. In the simplest case, a ramp whose gradient is able to be set is used. In particular when taking into account oscillation, it may be expedient to use a plurality of combined ramp functions between which there may also be pauses, that is to say portions of time in which the active power is kept at its value before it is increased again with the next ramp or partial ramp. It is also possible to predefine a closed overall ramp-up profile using what is known as a predetermined trajectory, that is to say a time-dependent profile of the active power.

A temporal increase in the reactive power to be fed in or a reactive current to be fed in, in particular using a ramp function with a predetermined gradient or using a plurality of combined ramp functions with different gradients or using a predetermined trajectory. The increase in the reactive power may also thereby be controlled in a time-dependent manner. The explanations with regard to active power apply analogously in the same way here.

At least one starting value of a time at which feeding-in is resumed following the grid fault or the end of the grid fault, a holding value of an active power or of an active current and/or of a reactive power or of a reactive current that specifies a value to which the active power or the active current and/or the reactive power or the reactive current is ramped up following the starting value and remains unchanged for a predetermined duration, and a gradient that specifies a flank for the profile of the active power or the active current and/or the reactive power or the reactive current from the starting value to the holding value. It has in particular been recognized here that it may be advantageous not to start ramping up immediately following the grid fault, but rather with a slight time delay. Such a time delay may be in the range from 100 to 500 ms. It is furthermore proposed to initially ramp up to a holding value, that is to say not to ramp up fully. This holding value is maintained for a predetermined duration. A plateau thus follows a ramping-up ramp for this predetermined duration. The predetermined duration may be in the range from 200 to 1000 ms. At the same time, the further profile may be identified by the gradient of the respective flank. This is preferably predefined for active power and reactive power, but they may be predefined independently of one another. In both cases, this in principle involves feeding in active power and reactive power and ramping up these powers, but this may in fact be achieved by correspondingly controlling the corresponding current, specifically the active or reactive current.

A trigger voltage that specifies a voltage value or a value of a voltage change at which an end of the grid fault is detected after recovery following the grid fault or the end of the grid fault. In particular in the case of a grid fault that leads to a voltage dip, a threshold value may be defined through this trigger voltage. Only when the voltage has exceeded this value again, that is to say in particular the grid voltage or an equivalent voltage, may the end of the grid fault be assumed. Such a value may be in the range from 50 to 90% of the nominal grid voltage or 50 to 90% of the grid voltage prior to the grid fault. It is thereby possible to predefine a clearly defined value and an evaluation by way of corresponding evaluation logic is also thereby made possible.

According to one embodiment, it is proposed for a multi-variable function to be used as support control function. A multi-variable function should in this respect be understood to be a function that depends on a plurality of input variables.

A reactive power or a reactive current as a function of time and additionally as a function of the grid voltage or of a grid voltage change is in particular proposed as multi-variable function for the support control function. It is thereby possible for the reactive power to be ramped up over time following the grid fault, but at the same time also to take the voltage into account such that for example the reactive power is increased to a greater or lesser extent depending on the grid voltage or grid voltage change than would be predefined by time alone.

An active power or an active current as a function of time and furthermore as a function of the grid voltage or a grid voltage change is preferably proposed as multi-variable function. The explanations with regard to the reactive power also apply analogously here. This also in some way involves ramping up the active power as a function of time and at the same time taking the voltage into account. It is pointed out in particular that specifically the active power is usually changed more depending on the grid frequency than on the grid voltage, but taking the grid voltage into account following a grid fault when ramping up again is particularly expedient here in order to achieve a stable operating point.

An active power or an active current as a function of time and furthermore as a function of the grid frequency or a grid frequency change is preferably proposed as multi-variable function. The explanations with regard to the reactive power also apply analogously here. This also in some way involves ramping up the active power as a function of time and at the same time taking the frequency into account. It is thereby additionally possible to take into account that the active power, which is usually changed depending on the grid frequency rather than on the grid voltage, is taken into particular account here following a grid fault when ramping up again in order to achieve a stable operating point.

The multi-variable function is preferably a reactive power or a reactive current as a function of time and furthermore as a function of a fed-in active power and furthermore also of the grid voltage or grid voltage change. A multi-variable function that depends on three variables is thus proposed here. The fed-in active power is in particular added here as a further input variable. It is in particular possible here to take into account aspects such as for example whether the reactive power should be increased more quickly or more slowly than the active power. It is preferably proposed here for the support control function to consist of a plurality of these multi-variable functions. It is in particular considered for it to consist of an active power or an active current as a function of time and the grid voltage or a grid voltage change, on the one hand, and the reactive power or the reactive current as a function of time and the fed-in active power and the grid voltage or grid voltage change, on the other hand. It is in particular considered here for the reactive power, as one multi-variable function, to thereby also be oriented inter alia toward the active power as the other multi-variable function. By way of example, the active power may be controlled in a time-dependent and voltage-dependent manner, specifically in particular ramped up, and this manner of ramping up the active power then also influences, in addition to the time and the grid voltage, the control of the reactive power or the control of the reactive current.

According to one embodiment, it is proposed for information or parameters for selecting or setting a support control function to be received externally before the grid problem or grid fault occurs, in particular for the information or parameters to be received by the converter-controlled generation unit at predetermined and/or individually changing time intervals and/or following a change in their contents.

It is in particular proposed here for the support control function to be regularly updated completely independently of the grid problem or grid fault. This is then constantly available and needs to be used only in worst-case scenario. If a grid fault thus occurs or its end has been recognized, it is easily possible to switch from the normal control function to the support control function. The constant, at least regular updating ensures that a suitable support control function is then also available.

This updating may be predefined by durations or updated on the basis of situation changes. If the situation changes, that is to say if for example a directly coupled synchronous generator is connected or disconnected, the support control function may be changed. If it is changed, this may be a reason for triggering transmission of this changed support control function. Likewise, when the support control function is not transmitted but rather is changed directly, the change in situation mentioned by way of example, that is to say the connection or disconnection of the directly coupled synchronous generator mentioned by way of example, may also as such trigger the setting, that is to say changing, of the support control function. The corresponding information is then transmitted.

Durations of a few minutes to a few hours are preferably proposed as predetermined time intervals. It is in particular proposed for the predetermined time intervals to be in a range from 10 minutes to 5 hours, in particular in a range from 30 minutes to 2 hours.

What is additionally proposed is a generation unit, in particular a wind power installation, a wind farm, an electrical energy store or a combination thereof. This generation unit is converter-controlled and designed to exchange electric power with an electricity supply grid that has a grid frequency. This exchange of electric power takes place at a grid connection point of the electricity supply grid.

The generation unit comprises a converter for exchanging electric power depending on a control function, wherein the electric power may comprise active and reactive power. What is thus provided is a converter that is able to feed electric power into an electricity supply grid. It may possibly however at least also draw reactive power from the electricity supply grid, possibly also active power, such that it is in this respect designed to exchange electric power.

What is furthermore provided is a control device (i.e., controller) for controlling the exchange of electric power by way of a control function, wherein the control function controls the power depending on at least one state variable of the electricity supply grid. A grid voltage and a grid frequency each in particular come into consideration as state variable. In this case, the power is fed in or drawn depending on the grid voltage and/or the grid frequency. Other state variables however also come into consideration.

The control device is also configured such that it is possible to switch between a normal control function and at least one support control function, different from the normal control function, as control function. In this case, the normal control function is used when it has been recognized that the electricity supply grid is operating relatively stably. The support control function is used when a grid problem, grid fault or an end of the grid fault has been recognized. Use is also made of such a support control function that controls fed-in power such that it is possible to counteract an oscillation in the electricity supply grid, in particular an oscillation of a synchronous generator connected to the electricity supply grid or an oscillation caused by the synchronous generator. This concerns in particular synchronous generators coupled directly to the electricity supply grid.

What is thus proposed is a generation unit that is designed to perform a method according to one of the embodiments described above. Reference is accordingly made, for further explanations, to explanations regarding at least one embodiment of the method.

A data interface for the generation unit is preferably provided in order to receive information or parameters externally in order to select and/or set a control function. Such a data interface may in particular be used by the grid operator to influence the control function. Said grid operator may specifically use it in particular to select a control function, in particular from a plurality of predefined functions, or said grid operator may, as an alternative or in addition thereto, use it to set or accordingly change the control function. This in particular involves selecting and/or setting the support control function. It however also comes into consideration for the normal control function to be able to be selected or set thereby.

BRIEF DESCRIPTION OF THE SEVERAL VIEWS OF THE DRAWINGS

The invention will be explained in more detail below by way of example on the basis of embodiments with reference to the accompanying figures.

DETAILED DESCRIPTION

Figure 1:
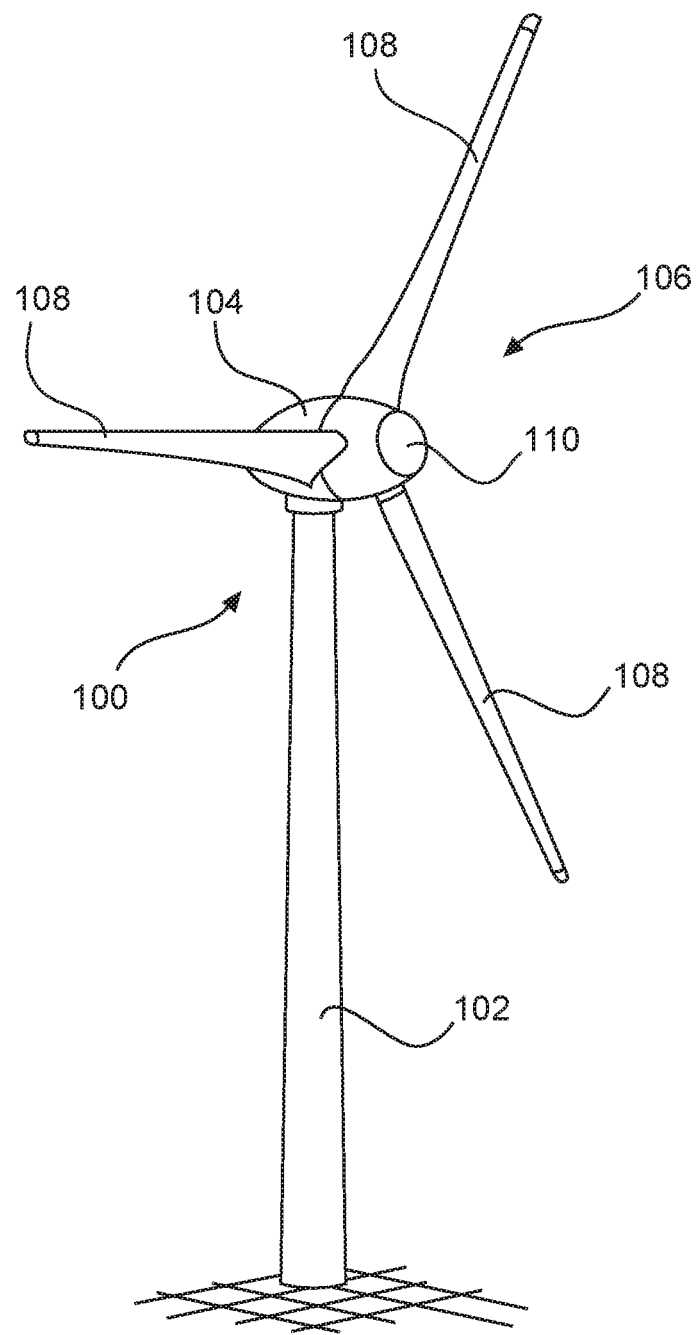
FIG. 1 shows a perspective illustration of a wind power installation.

FIG. 1 shows a wind power installation 100 with a tower 102 and a nacelle 104. Arranged on the nacelle 104 is a rotor 106 with three rotor blades 108 and a spinner 110. During operation, the rotor 106 is set in rotational motion by the wind and thereby drives a generator in the nacelle 104.

Figure 2:
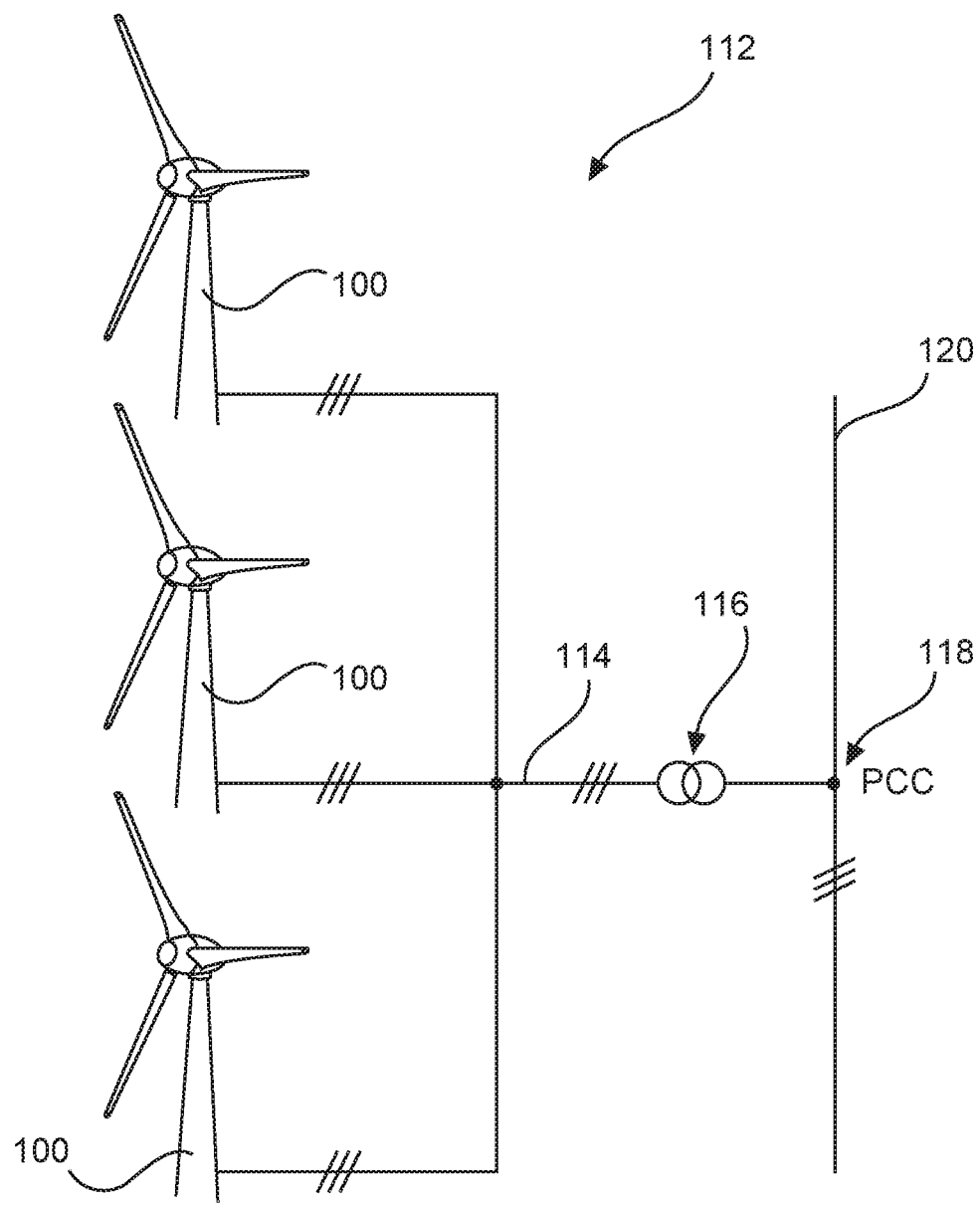
FIG. 2 shows a schematic illustration of a wind farm.

FIG. 2 shows a wind farm 112 having, by way of example, three wind power installations 100, which may be identical or different. The three wind power installations 100 are thus representative of basically any desired number of wind power installations of a wind farm 112. The wind power installations 100 provide their power, specifically in particular the generated current, via an electrical farm grid 114. In this case, the respectively generated currents or powers of the individual wind power installations 100 are added and a transformer 116 is usually provided, which steps up the voltage in the farm in order to then feed into the supply grid 120 at the infeed point 118, which is also generally referred to as PCC. FIG. 2 is only a simplified illustration of a wind farm 112, which does not show, for example, a control system, although a control system is present, of course. For example, the farm grid 114 may also be designed in another way by virtue of for example a transformer also being present at the output of each wind power installation 100, to mention just one other exemplary embodiment.

Figure 3:
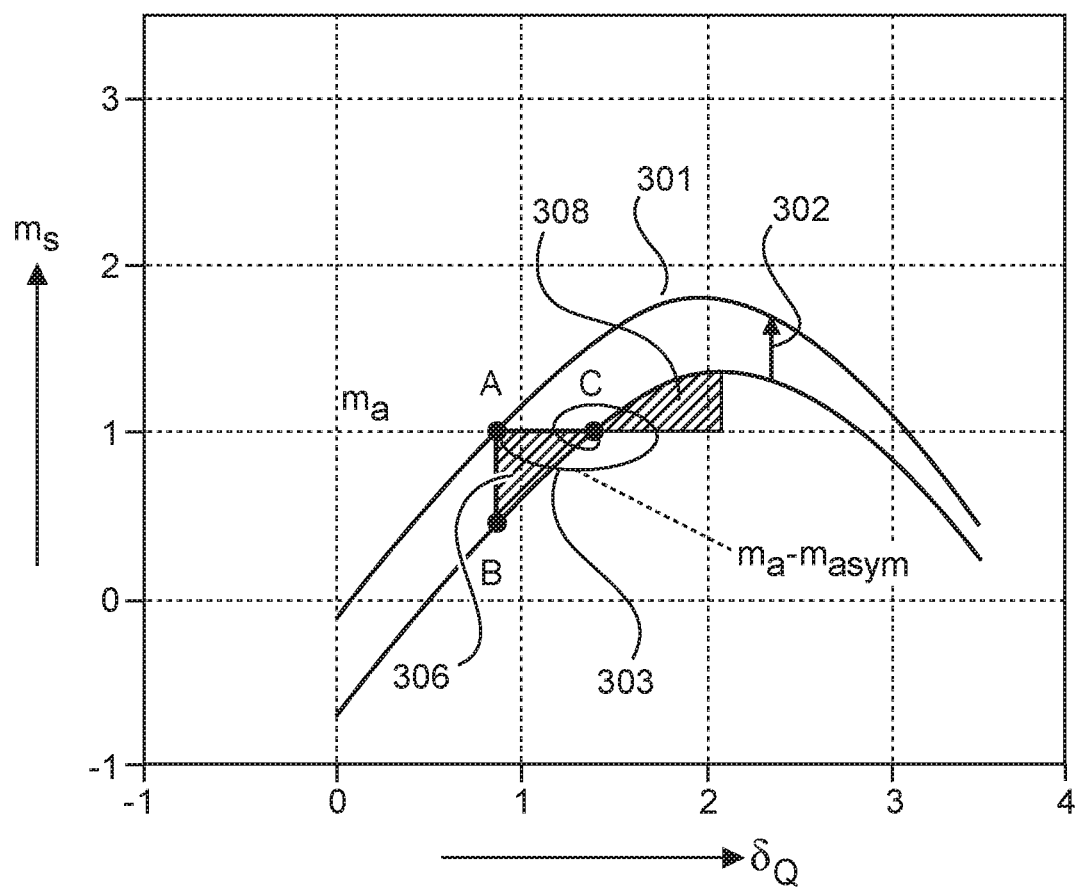
FIGS. 3 to 5 show graphs of possible behaviors of a synchronous machine in the vicinity of a converter-controlled generation unit.
Figure 4:
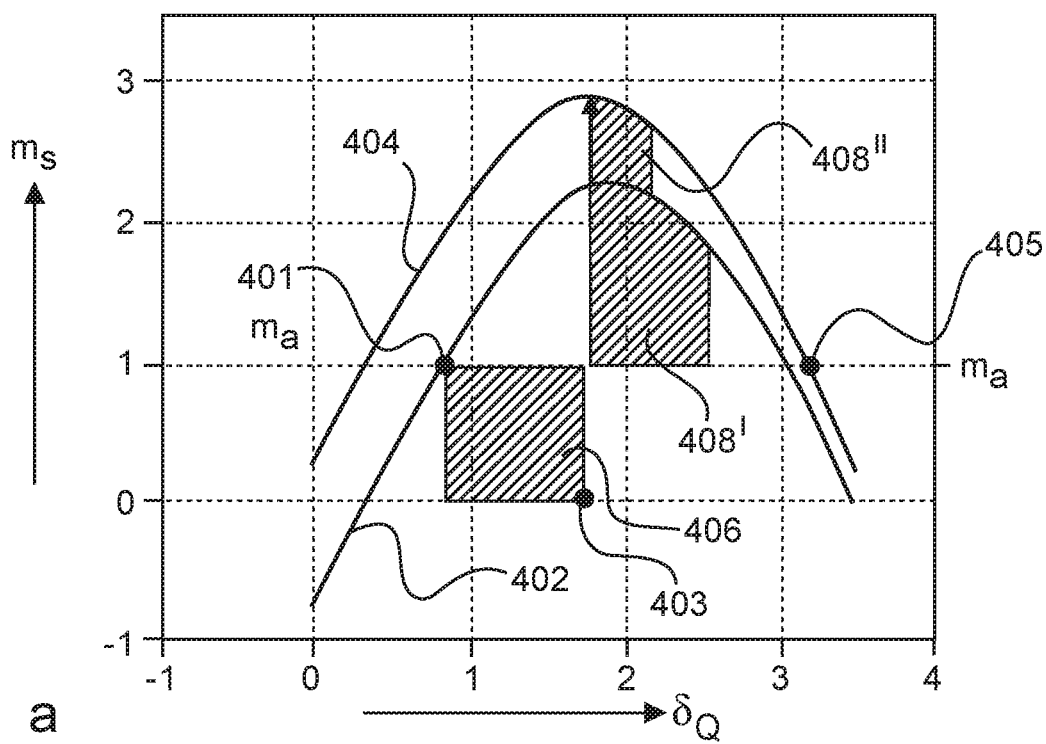
Figure 5:
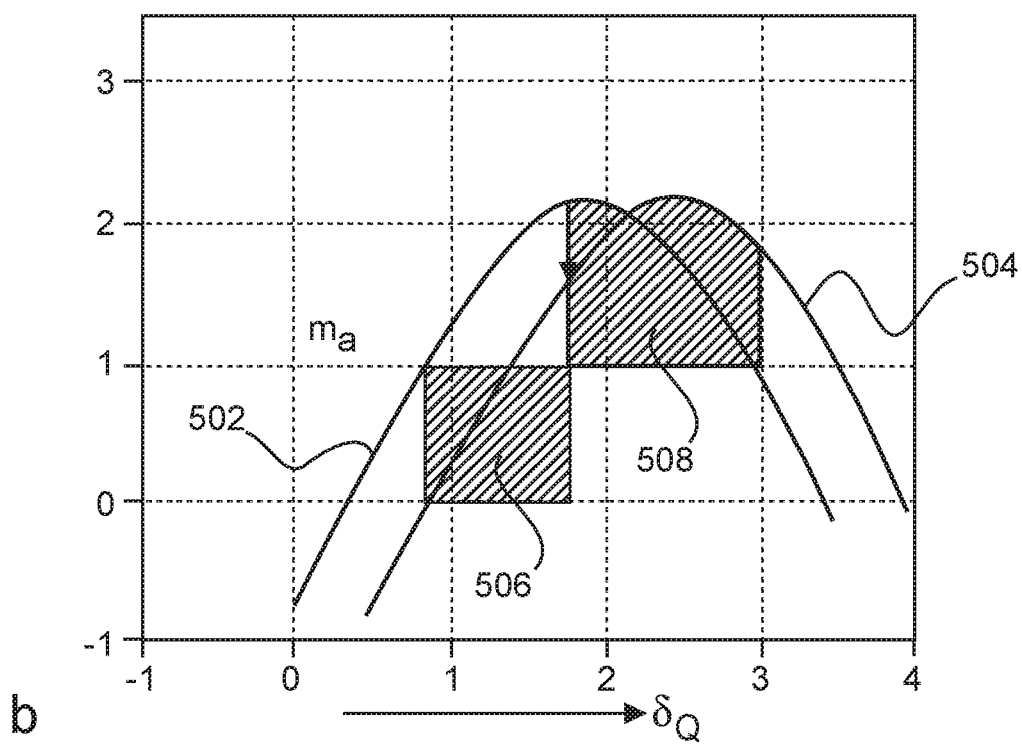

FIGS. 3 to 5 illustrate behaviors of a synchronous machine coupled directly to the electricity supply grid in the vicinity of a converter-controlled generation unit, in particular in the vicinity of a wind power installation or a wind farm. Different effects are illustrated in this case.

Basically, the problem has been recognized that synchronous generators or synchronous machines, which is used here as a synonym, in the event of a grid fault that leads to a voltage dip, may start oscillating, which may in particular be triggered by a phase jump. Following a voltage dip, the average pole wheel angle then shifts forward, since the machine was not able to deliver the full active power into the grid during the voltage dip.

Synchronous machines may also be set in oscillation by a sudden parallel infeed of active power, this being illustrated by FIG. 3. FIG. 3, and the same applies to FIGS. 4 and 5, shows operating characteristic curves of a synchronous machine, specifically the machine torque ms as a function of the pole wheel angle $\delta_Q$.

FIG. 3 illustrates the behavior of a synchronous machine that is operated in the vicinity of a converter-controlled generation unit in response to a rapid connection of a parallel infeed of active power, specifically in particular by a nearby converter-controlled generation unit. The operating characteristic curve 301 with the operating point A shows the situation prior to the rapid connection. As a result of the sudden parallel infeed of active power, this operating characteristic curve 301 suddenly changes to the new operating characteristic curve 302, and the new operating point B results initially, at least ideally, from the current pole wheel position. The drive torque, which is still constant, of a power plant is however not able to be absorbed by the synchronous generator at this operating point, giving rise to excess torque, and the pole wheel is accelerated according to this excess torque and the inertia of the entire rotor. When the pole wheel passes through the axis of the nominal torque, although the torques are still balanced, the kinetic energy in the rotor leads to the pole wheel passing through the characteristic curve, specifically the new operating characteristic curve 302. The pole wheel is in this case braked again by the higher torque. This excess energy should be dissipated again as quickly as possible so that the synchronous machine returns to a normal operating state again.

A possible recovery is illustrated by the transition section 303. In this case, operating point A transitions in a vibrating and thus oscillating manner to operating point C on the new operating characteristic curve 302. An acceleration surface 306 and a braking surface 308 are shown in order to clarify the problem. In the example that is shown, the situation is illustrated for a stable compensation procedure. The acceleration surface 306, that is to say essentially the triangle ABC, is in this case smaller than the possible braking surface 308. The movement is thus braked to a greater extent than it is accelerated, and the possible braking energy is thus greater than the acceleration energy. FIG. 3 illustrates the situation for a stable compensation procedure. The acceleration surface, that is to say essentially the triangle ABC, is in this case smaller than the possible braking surface, specifically the surface above the value for m=1 and to the right of point C.

It has now been recognized that it may be a problem when both said oscillatory excitations are overlaid to an excessive extent, since the synchronous machine could thereby be disrupted. This should be avoided. Such a case arises when the excitation, identified specifically by the acceleration surface 306, is greater than the braking, identified by the braking surface 308, that is to say when an excitation or surface equivalent thereto is greater than the possible braking surface.

To this end, it has also been recognized that this problem may occur in particular with a high saturation of converter-controlled generation units and should therefore in particular be taken into account in this case. Converter-controlled generation units may feed in such a power jump, which may thus constitute a risk. It has however also been recognized that converter-controlled generation units are able to be controlled in a targeted manner in order to avoid, to reduce or to solve the problem. By way of example, the transition section that is shown may be influenced and designed differently through such converter-controlled generation units.

One option proposed here for improving post-fault stability, that is to say for improving said problem, is that of recognizing the oscillatory behavior and responding appropriately thereto. To this end, it has in particular been recognized that excitation first takes place specifically due to the fault, and excitation may then occur again due to the effect that is explained in FIG. 3. Specifically, excitation first takes place that occurs due to the fault, and excitation then takes place again due to the effect that has been described in FIG. 3.

In this case, a distinction may be drawn between the following different strategies, which are proposed as embodiments.

One option is analyzing the frequency gradient df/dt. If df/dt>0, it is proposed to delay the active power recovery, whereas a rapid active power recovery is proposed for df/dt<0.

Depending on a frequency analysis or based thereon, it is proposed to improve the stability immediately following the fault through an active power recovery during the return oscillation of the pole wheel. This is illustrated in FIG. 4. Here, the operating characteristic curve 402 shows the situation following the rapid connection. If less active power is then fed in by the nearby converter-controlled generation unit during the return oscillation, this supports the active power recovery of the synchronous machine, since this leads to the operating characteristic curve 402 being increased to the increased operating characteristic curve 404.

The pole wheel of the synchronous generator whose oscillations are under consideration is accelerated further from the pre-fault state, that is to say from the starting point 401 during the fault, to an intermediate point 403 that is further to the right and below. One condition for a stable recovery is now that the surface to the left of the acceleration surface 406 shown by the intermediate point 403 is not larger than the original braking surface 408 that is located to the right and above the intermediate point 403, specifically under the original curve, that is to say under the operating characteristic curve 402.

The original braking surface 408', which is situated below the original curve 402, and the changed braking surface 409, likewise illustrated, which is situated under the shifted operating characteristic curve 404, are in this case of the same size. It however appears that the shifted curve 409 is at a greater distance from the tipping point 405 that is formed by the intersection of the curve with the torque ma.

As a result of this greater distance, the shifted operating characteristic curve 404 has more stability reserves, this being able to be achieved by shifting the operating characteristic curve as described. It has been recognized that it is also able to be recognized therefrom that the duration and the severity of the fault and thus the position of the pole wheel may under some circumstances be used as a support variable.

It should however be borne in mind that the pole wheel is accelerated from the pre-fault state, which is identified by the black dot 401, to a point further to the right and below (403) during the fault. One condition for a stable recovery is in this case that the surface to the left of the point 403 is not larger than the surface to the right and above the point 403, below the curve. The surface 408', which is situated below the old operating characteristic curve 402, and the surface 408", which is situated below the shifted operating characteristic curve 404, are in this case of the same size. It however appears that the surface 408" is at a greater distance from the tipping point that has the intersection of the curve with the torque ma than the surface 408' and therefore has more stability reserves.

Here too, it appears that the duration and the severity of the fault (and thus the "location" of the pole wheel) may under some circumstances be used as a support variable.

Stabilization through a forced infeed of reactive power is proposed as a further strategy. This is illustrated in FIG. 8C. Here, the operating characteristic curve 830 shows the situation following a rapid connection. The proposed forced infeed of reactive power by a nearby converter-controlled generation unit leads to the shift to the changed second operating characteristic curve 834. In this case too, the ratio of an acceleration surface to a braking surface is able to be improved. The acceleration surface results from the fault, and it fundamentally has to be smaller than the braking surface.

Although the effect of the infeed of reactive power is less than that brought about by the infeed of active power, it is possible to achieve an improvement in the damping of a synchronization procedure, that is to say a procedure in which the speed of the synchronous generator is synchronized back to the grid frequency, ideally to the grid nominal frequency, especially by modulating the reactive power, which may be achieved by modulating the admittance $Y_L$, specifically using power electronics of the wind farm 812 depending on the speed deviation.

According to one embodiment, it is proposed for the converter-controlled infeed apparatus, in particular the wind farm, to be equipped with at least one apparatus for feeding in a transverse voltage. This may be achieved using a FACTS device or a transverse transformer. A stability reserve of a synchronous machine is thereby able to be achieved through targeted shifting of the pole wheel angle. This is illustrated in FIG. 5, which shows a shift of the operating characteristic curve 502 to a shifted operating characteristic curve 504. In this case, a shift may have a stabilizing effect in both directions, depending on the size of the pole wheel angle. The acceleration surface 506 and the shifted braking surface 508 show that the stability reserve is increased by shifting the operating characteristic curve from 502 to 504.

The pole wheel angle of the synchronous machine may also be changed to a small extent through a targeted infeed of active and reactive power. In this case, it is necessary to change active power and reactive power such that a shift according to FIG. 5 is exactly achieved. In this case, the effects of FIGS. 8B and 8C, which are explained in more detail further below, are overlaid. The effect is however far smaller than that of impressing a transverse voltage, for which reason it is also possible to use a modulation of the pole wheel angle again for stabilization purposes, in comparison with simply increasing the stability reserve.

One particular advantage of simply shifting the operating characteristic curve is the fact that the stabilizing measures may give rise to fewer effects on the voltage than in the case of the other proposed measures.

Figure 6:
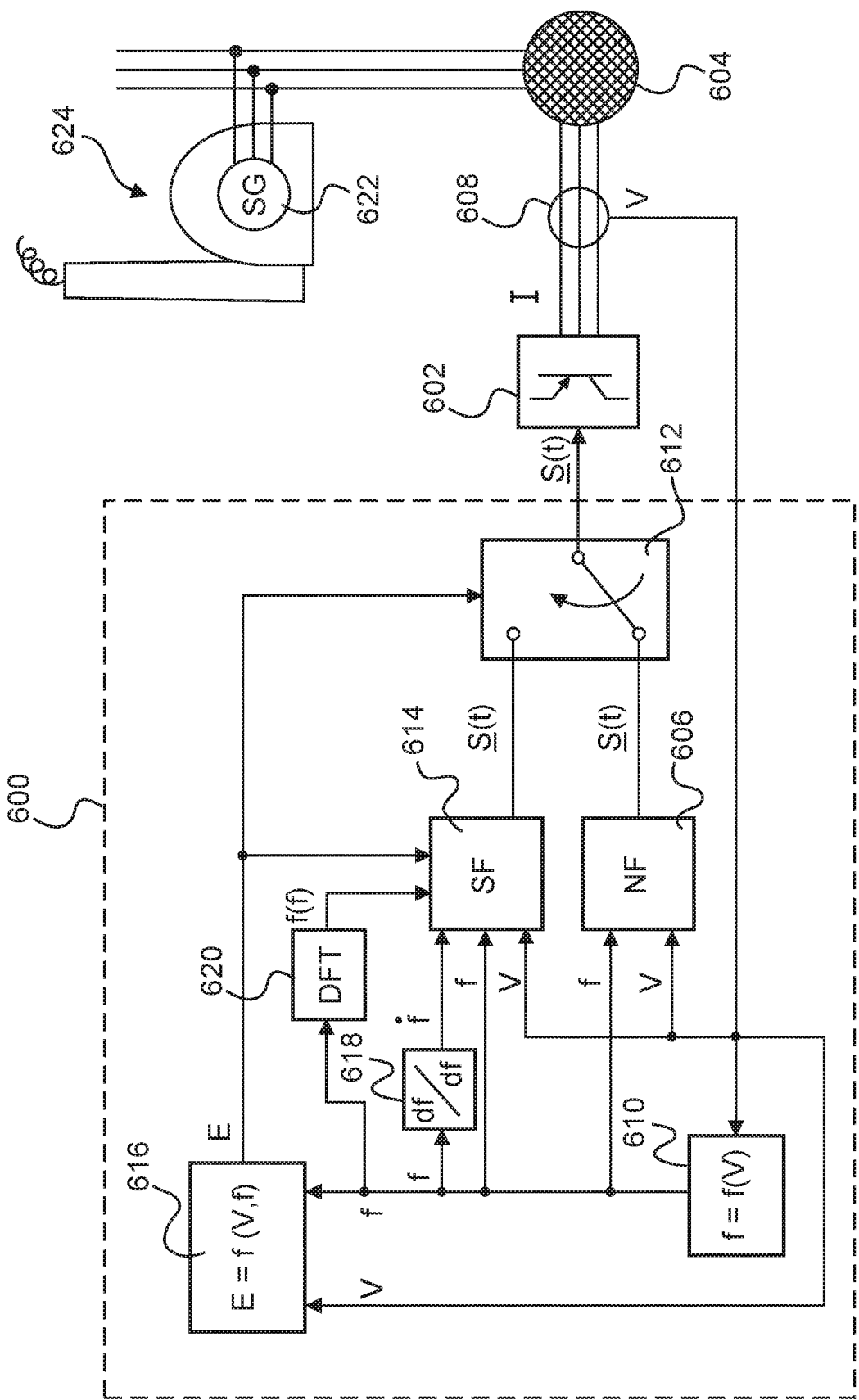
FIG. 6 schematically shows a structure of a controller with a feed-in apparatus.

FIG. 6 schematically shows a controller 600 having an infeed apparatus 602 that feeds into an electricity supply grid 604. The infeed apparatus 602 in this case receives a power setpoint value $\underline{S}(t)$ from the controller 600. In this respect, reference is generally made here to the complex apparent power, that is to say the apparent power in terms of magnitude and phase. Such a power specification may often however also be made such that for example the active power P(t) and the reactive power Q(t) are predefined as separate values. Power or power specification are mentioned here below for the sake of simplification, this being able to mean active power and/or reactive power. It is furthermore clarified that this power depends on the time t, that is to say that no constant is used, but rather a value or a plurality of values that may fluctuate.

The infeed apparatus 602 then receives this power specification and generates a 3-phase current I therefrom, this current also being able to be referred to as infeed current here, which is fed into the electricity supply grid 604. A transformer could for example also be arranged between the infeed apparatus 602 and the electricity supply grid 604, this however not being the case here. A grid choke is likewise often provided, this also not being shown here and being able to be understood as part of the infeed apparatus 602. The infeed apparatus 602 may be formed of one or more inverters that draw their power in particular from a generator of a wind power installation. In order to control the power in accordance with the power specification $\underline{S}(t)$, it is often also necessary to control the power of said generator or to control this generator. This should be understood here as the power specification $\underline{S}(t)$ for the infeed apparatus 602. In other words, this power specification will also be incorporated for controlling a generator or controlling a required power source in another way. Such an implementation is known in principle to a person skilled in the art, and so no further details are explained here.

In a normal case in which the grid is operating stably and in particular no grid problem or grid fault has occurred, a normal control function generates the power specification $\underline{S}(t)$ in the normal control function block 606. To this end, the normal control function block 606 receives the grid voltage V and the grid frequency f as input variables.

To this end, the grid voltage V is recorded by the voltage measurement means 608, which should also be understood to be merely a schematic illustration. The frequency f may be recorded from the grid voltage V recorded in this way using the frequency determination block 610 and then be incorporated into the normal control function block 606 as further input variable. The grid voltage V and the grid frequency f are not illustrated as time-dependent variables merely for the sake of simplicity. In fact, however, they are both time-dependent and this time dependency, that is to say their change over time, is often also relevant here.

In any case, the normal control function block 606 then determines the power specification $\underline{S}(t)$ and this is transmitted to the infeed apparatus 602 by the selection apparatus 612 in the normal case, that is to say when no grid problem or fault is present or was present a short time ago and no stability loss of the electricity supply grid 604 should otherwise be expected either. The normal control function that is stored or implemented in the normal control function block 606 may in particular also determine an active power specification P as a function of the grid frequency and determine a reactive power specification Q as a function of the grid voltage V. The result may then be combined in the power specification $\underline{S}(t)$. In principle, however, it also comes into consideration for no reactive power component Q or no active power component P to be determined.

If a grid problem, grid fault or an end of such a grid fault is then present, then the selection apparatus 612 changes over and forwards a power specification $\underline{S}(t)$ from the support control function block 614 to the infeed apparatus 602.

Such a changeover may be triggered by recognizing a grid problem, grid fault or end of such a grid fault. This is illustrated in FIG. 6, by way of simplification, as an event E. This event E is recognized in an event recognition unit 616. It is pointed out at this juncture that both the event recognition unit 616 and the selection apparatus 612 and also the other elements that are illustrated may also be designed differently. The structure shown overall for the controller 600 may in particular also be in the form of software in a controller, to cite just one further example.

In any case, the event recognition unit 616 illustrates that the event E may be detected depending on the grid voltage V and the grid frequency f. This may for example appear such that a voltage dip leads to the recognition of an event E. In this case, it would not be necessary to evaluate the grid frequency f. It however also comes into consideration that, without a voltage dip in the grid voltage V, a frequency oscillation occurs that is so great, and is thus able to be detected on the basis of the frequency f, that this leads to the recognition of an event E. In this respect, the dependency of the event E on the grid voltage V and the grid frequency f should also be understood such that both variables are monitored for this purpose. In principle, however, it also of course comes into consideration that both variables together lead to the recognition of an event E. Further variables may furthermore also be used, such as for example a time derivative of the grid frequency, to cite just one further example, which is however not shown here as input variable for the event recognition unit 616 for the sake of simplicity.

The support control function in the support control function block 614 receives the grid voltage V and the grid frequency f as input variables, in exactly the same way as the normal control function block 606. In addition, the support control function and therefore the support control function block 614 receives a time derivative $\dot{f}$ as further input variable from the grid frequency f. This derived grid frequency $\dot{f}$ is generated in the derivation apparatus 618. An active power P may in particular be generated depending on such a frequency derivative $\dot{f}$, or jointly take this into account.

There is furthermore also provision for frequency analysis or via a DFT in the frequency analysis apparatus 620. The result is in particular a frequency spectrum f(f) of the grid frequency f. A characteristic oscillation of a synchronous generator 622 of a large-scale power plant 624, schematically illustrated in FIG. 6, is able to be recognized through frequency analysis, that is to say for example an appropriate Fourier transformation. This frequency-dependent frequency spectrum f(f) may thus likewise be evaluated in the event recognition unit 616, this not being illustrated here merely for the sake of simplicity. In particular, according to one embodiment, the event recognition unit 616 may identify the characteristic oscillating frequency of the synchronous generator 622 from the frequency spectrum f(f) of the grid frequency f that the frequency analysis apparatus 622 generated, and it may then be established when monitoring the grid frequency f whether the grid frequency f oscillates in line with this characteristic frequency of the synchronous generator 622. If this is performed at a suitably high amplitude, this may lead to an event E being recognized. This event E may accordingly also form an input variable for the support control function and thus the support control function block 614. Such a recognized event E may in this case be used for the support control function in the support control function block 614 as a temporal, specifically temporally accurate, trigger, as it is called in the jargon.

The frequency spectrum f(f), which is likewise an input variable for the support control function block 614 according to the schematic illustration of FIG. 6, may in particular also be used to adjust the support control function or its parameterization. Dynamics, in particular an eigenvalue, of the support control function may in particular depend on a recorded characteristic oscillation frequency of the synchronous generator 622.

If an event E is thus recognized, the selection apparatus 612 changes over such that the power specification $\underline{S}$(t) is predefined by the support control function in the support control function block 614, and to this end the support control function block 614 receives the grid voltage V, the grid frequency f and its derivative f as input variables. The frequency spectrum f(f) and the triggering or recognized event E may furthermore additionally be taken into account.

The eigentype and the behavior of the synchronous generator 622 are thereby able to be recorded and responded to specifically. As a result of the close proximity, in the electrical sense, between the synchronous generator 622 and the infeed apparatus 602, and thus a converter-controlled generation unit for which the controller 600 and the infeed apparatus 602 stand together, this generation unit may be used to influence the behavior of the synchronous generator 622 in a targeted manner, specifically by cleverly feeding in a power $\underline{S}$(t).

Figure 7:
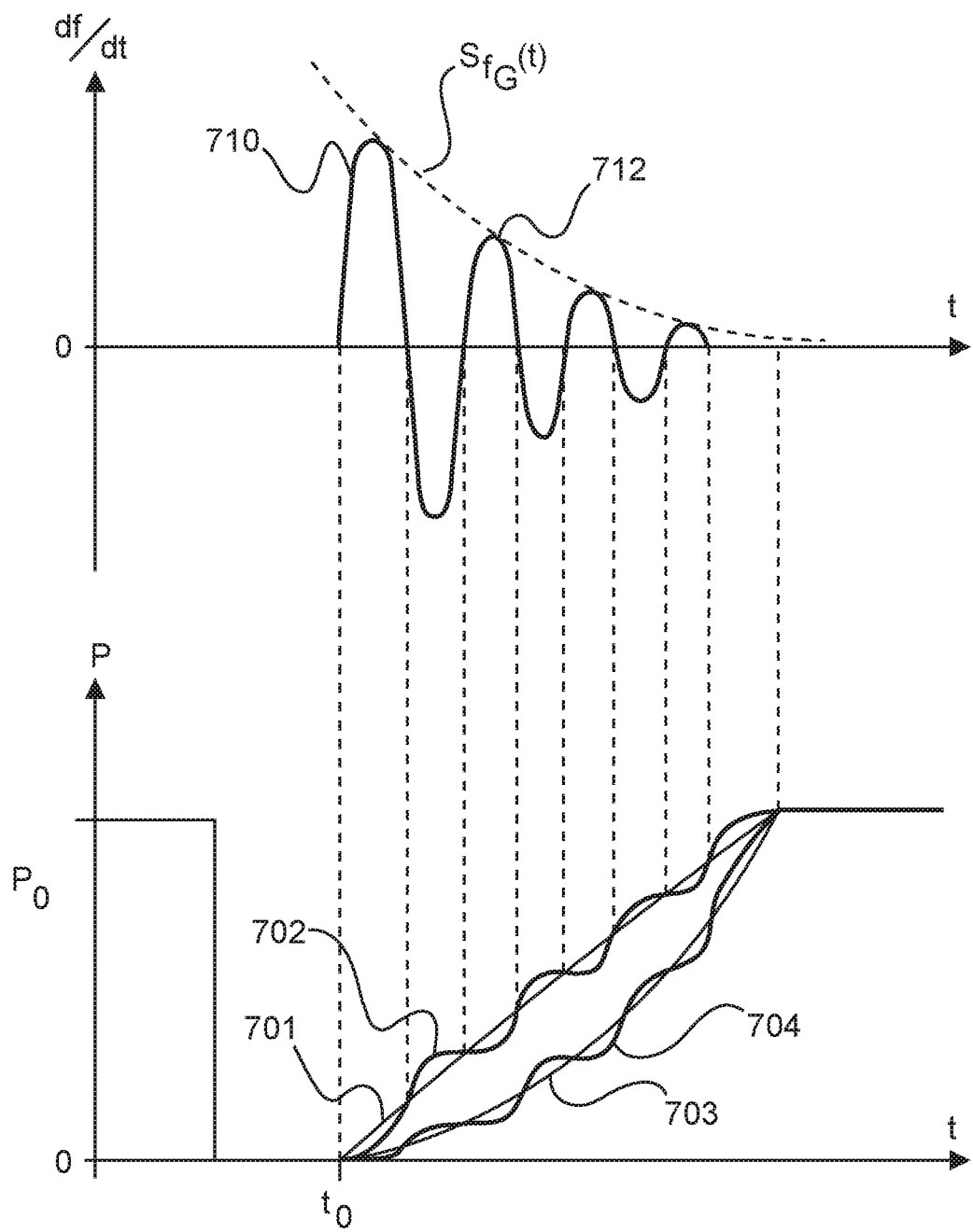
FIG. 7 schematically shows a graph with various strategies for increasing a power following a grid problem, grid fault or end of the grid fault.

FIG. 7 schematically shows a graph with various strategies for increasing a power following a grid problem, grid fault or end of the grid fault. In this case, the upper graph shows a frequency gradient 710 that may also be referred to mathematically as df/dt, with a subsiding amplitude. The lower graph in this respect shows various power increases as power profiles 701 to 704. Both graphs use the same time axis.

FIG. 7 in this case shows a power dip in which the power drops for example from a starting value $P_0$ to 0. The actual consideration or illustration however begins only at the time $t_0$ at which an infeed of power, specifically an infeed of active power, is then intended to be absorbed again. The oscillatory behavior of the frequency illustrated in the top graph or the illustrated oscillation of the frequency gradient 710 is also considered only after this time $t_0$. In particular, both graphs are not matched to one another in the region before the time $t_0$.

In any case, the grid frequency at the time $t_0$ has an approximately sinusoidal oscillation that subsides. The profile of the frequency gradient 710 is accordingly also approximately sinusoidal and subsiding. Also furthermore plotted is a profile of a peak value $S_{fG}(t)$ of the frequency gradient 710, which may also be referred to as peak value function 712. The peak value function 712 thus specifies, at all times, a maximum value of the frequency gradient 710, and thus forms for instance an upper curve of two enveloping curves of the oscillating frequency gradient.

Various options for increasing the power are specified in the lower graph as a function of the frequency gradient 710. The first power profile 701 forms a simple ramp that does not depend on the frequency gradient 710. Such a ramp may form the prior art, but it may also serve as a basis for being overlaid with a power function dependent on the frequency gradient 710.

The second power profile 702 shows such an overlay. This consists of the ramp of the first power profile 701 or a similar ramp, and a power function directly dependent on the frequency gradient and that forms the second power profile 702 when overlaid with the ramp. The power function directly dependent on the frequency gradient may for example be a function proportional to the frequency gradient. This thus results in a rise in the power, which may however counteract oscillations in a targeted manner, this being able to be achieved by the overlaid power function dependent on the frequency gradient. The power thus rises without in the process exciting the oscillation that is reflected in the frequency gradient 710. Such an oscillation is instead damped.

The third power profile 703 is dependent only on the peak value function, and thus does not consider the oscillation of the frequency gradient 710, but rather only the profile of the amplitude. The third power profile 703 therefore does not have any oscillation. It allows the power to rise only to a small extent at the start of the desired power increase. If the oscillation then subsides, the power may also be increased to a greater extent. The third power profile 703 thereby has a gradient that increases over time, this also being proposed as a general feature.

A further suggestion is that of overlaying a power function dependent on the frequency gradient 710 on the power profile 703. Instead of overlaying this power function on the ramped power profile 701, it is also proposed here to overlay this power function on the third power profile 703. The result is the fourth power profile 704. The described advantages are thereby able to be combined synergistically. The initially small rise in the third power profile prevents an excessively large power increase in an oscillating state and the power function directly dependent on the frequency gradient counter-controls the oscillations in a targeted manner. The small rise in the third power profile in particular also allows greater counter-control there through the power function directly dependent on the frequency gradient.

Figure 8A:
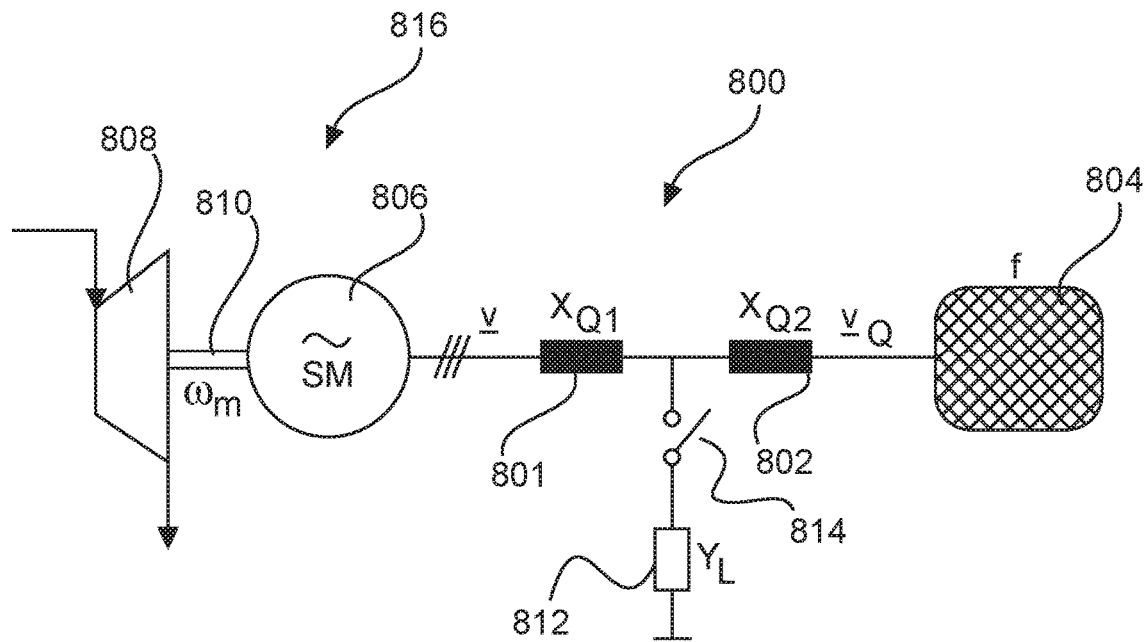
FIG. 8A schematically shows a grid structure with a directly coupled synchronous machine and a wind farm illustrated as consumer.
Figures 8B, 8C:
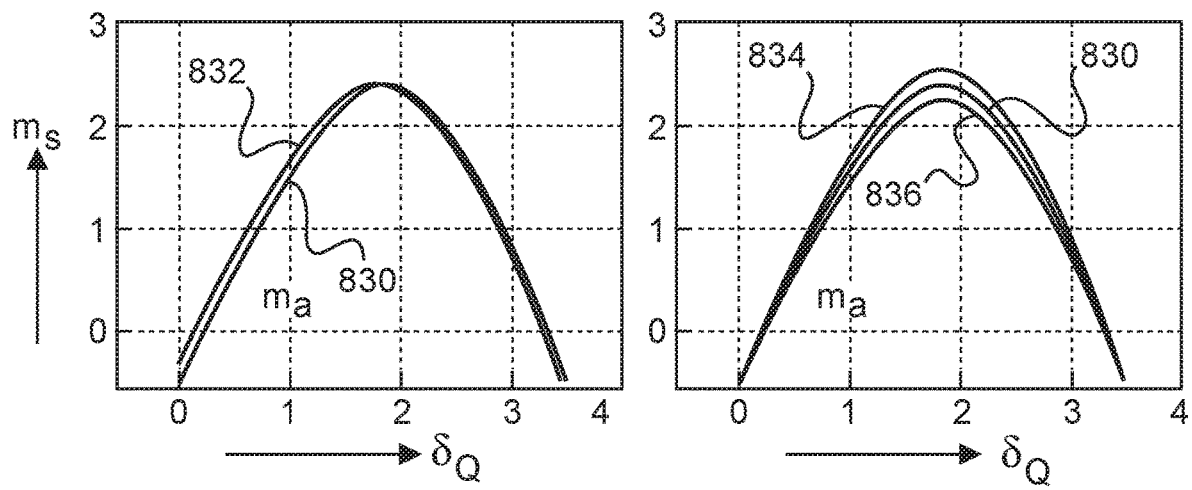
FIGS. 8B and 8C show operating characteristic curves for different conditions for the grid structure according to FIG. 8A.

The grid structure of FIG. 8A illustrates a grid section 800 that is formed essentially by a first and second reactance 801 and 802, which are assumed here to be of the same size for the sake of simplification. This grid section 800 is connected to the rest of the grid 804, which is assumed here for simplification purposes to be a fixed grid.

Also present is a synchronous machine 806, which may also be referred to as a synchronous generator and which is coupled directly, that is to say without the interposition of a converter, to the electricity supply grid, specifically here to the grid section 800 at the first reactance 801. The synchronous machine 806 may be driven by a turbine 808 with a drive shaft 810, this only being indicated here, and these three elements are also representative here of a power plant 816. The synchronous machine 806 is thereby connected to the rest of the grid 804 via this grid section 800. For this synchronous machine, the grid section 800, in particular the two reactances 801 and 802, form a load flow path.

A wind farm 812 is represented here as consumer by an admittance $Y_L$ and is connected between the first and second reactance 801, 802. A switch 814 illustrates that the wind farm 812 may also be disconnected from the grid section 800.

The structure of FIG. 8A may be used to illustrate the effect of an infeed by the wind farm 812 on a stability reserve of the power plant 816, which is connected to the grid 804 by way of its synchronous machine 806.

The wind farm 812 and thus the infeed is in this case connected in the load flow path, specifically between the first and second reactance 801, 802.

With regard to the structure of FIG. 8A, FIG. 8B shows an operating characteristic curve 830 that illustrates a torque-pole wheel angle dependency of the synchronous machine 806 during normal operation in the case of a parallel infeed by the synchronous machine 806 and the wind farm 812.

FIGS. 8B and 8C use the same illustration as FIGS. 3 and 4.

FIG. 8B illustrates how an operating characteristic curve changes when an infeed of active power through the wind farm 812 is reduced. FIG. 8B also shows how the operating characteristic curve 830 of the synchronous generator 806 shifts to the left and upward with respect to the changed first operating characteristic curve 832 as a result of the reduction in the infeed of active power.

This results in possible braking surfaces, as shown in FIGS. 3 and 4, and such possible braking surfaces may be increased through the targeted shifting. It is thus able to be seen that this excitation, that is to say this reduction in the infeed of active power, improves the stability reserve, or that a maximum possible excitation is increased in the case of such stable post-fault conditions.

FIG. 8C on the other hand shows the influence of an additional infeed of reactive power on the torque-pole wheel angle dependency by the wind farm 812. The starting operating characteristic curve 830 corresponds to the operating characteristic curve 830 of FIG. 8B. The operating characteristic curve 830 of FIG. 8C thus again forms an operating characteristic curve in the case of a parallel infeed by the synchronous generator 806, that is to say the power plant 816 and the wind farm 812.

If the wind farm 812 then feeds in an additional capacitive and thus overexcited reactive current, the stability reserve (the possible braking surfaces) of the synchronous machine 806 increases as a result of the shifting of the torque-pole wheel angle characteristic curve, that is to say the operating characteristic curve 830 upward to form a changed second operating characteristic curve 834. This shift specifically increases or enlarges the braking surfaces as were explained in FIGS. 3 and 4.

For illustrative purposes, FIG. 8C also illustrates a response to an infeed of an inductive reactive current by the wind farm 812. This results in the changed third operating characteristic curve 836, which is shifted downward. This shows that this infeed of an inductive reactive current worsens the stability of the synchronous machine 806 in accordance with the lower operating characteristic curve 836.

By feeding in an inductive reactive current in combination with an active power reduction by the wind farm 812, for example only the pole wheel angle of the synchronous generator 806 of the power plant 816 may be changed. As a result, the effects may be overlaid in accordance with the changed first and second operating characteristic curve 832, 834. The shift in the other direction may accordingly take place through an increase in active power with a simultaneous capacitive current infeed.

According to a further embodiment, a behavior of a synchronous machine is emulated in order to control the power infeed by the converter-controlled generation unit, and a virtual synchronous machine with a virtual moment of inertia may be used as a basis for this. This behavior and/or an increase in the virtual moment of inertia is preferably activated following a voltage recovery. Activation may also be considered when the pre-fault grid frequency, that is to say the frequency that was present before the fault, passes through the oscillating frequency. This would correspond to passing through a point of equilibrium.

Active oscillation damping is also proposed as a further strategy.

A simulation of a series resistance for example comes into consideration for this purpose. This leads to a voltage-dependent reactive power infeed through the infeed current that flows through the series resistance in the simulation.

A simulation of a frequency-dependent load, which thus leads to a frequency-dependent infeed power or drawn power, also comes into consideration.

Other active damping methods in which for example a correspondingly modulated power is fed in also come into consideration.

The proposed measures concern a hybrid supply structure in which feeding-in takes place conventionally and in a converter-controlled manner at the same time. It is thus also proposed to take into account the converter saturation and to take the proposed measures depending thereon.

In the case of a very high proportion of a converter-controlled infeed, in particular >95%, according to one aspect, it is proposed to change over to an active power recovery that is as fast as possible. An instability tendency of the synchronous machine is taken into consideration here, since priority has to be given to restoring the power balance in grids with a very high renewable saturation. This is in particular based on the finding that the inertia is low and the frequency sensitivity is high in such a system.

It has thus been recognized that, following a grid fault event, under some circumstances the type of active power recovery of converter-controlled feeders, such as for example photovoltaic systems (PV), wind power installations or battery stores, has an influence on the stability of synchronous machines. It has also been recognized that the effect is greatly dependent on the current proportion of converter-based feeders.

Up until now, a post-fault behavior was specifically prescribed in very few grid codes. Even if it is at all, only an active power recovery that is as fast as possible is mentioned. The resultant dynamic effects in the electrically nearby synchronous machines were not considered, and neither was the current proportion, that is to say the penetration, of converter-based feeders, that is to say of converter-controlled generation units, in the overall grid and in the vicinity of the corresponding wind power installation to be controlled.

A desired aim is thus also considered to be that of, in the future, making a fault ride-through behavior and also a post-fault behavior (FRT and post-FRT behavior) of a converter-controlled infeed unit dependent on the instantaneous penetration of the grid with converter-controlled infeed units and responding actively to an instability tendency. The following possibility should in particular be created for this aim:

Converter-controlled generation units respond to the post-fault behavior of the synchronous machines located nearby with tailored post-fault behavior.

A system stability and stability of electrically nearby synchronous generators in the case of a locally and globally high penetration with converter-controlled generation units is in particular intended to be achieved. Another intention is to achieve a situation whereby, in the future, more converter-controlled generation units are able to be built and connected to the grid, even if only a few directly coupled synchronous generators on the grid are still in operation.

Figure 9:
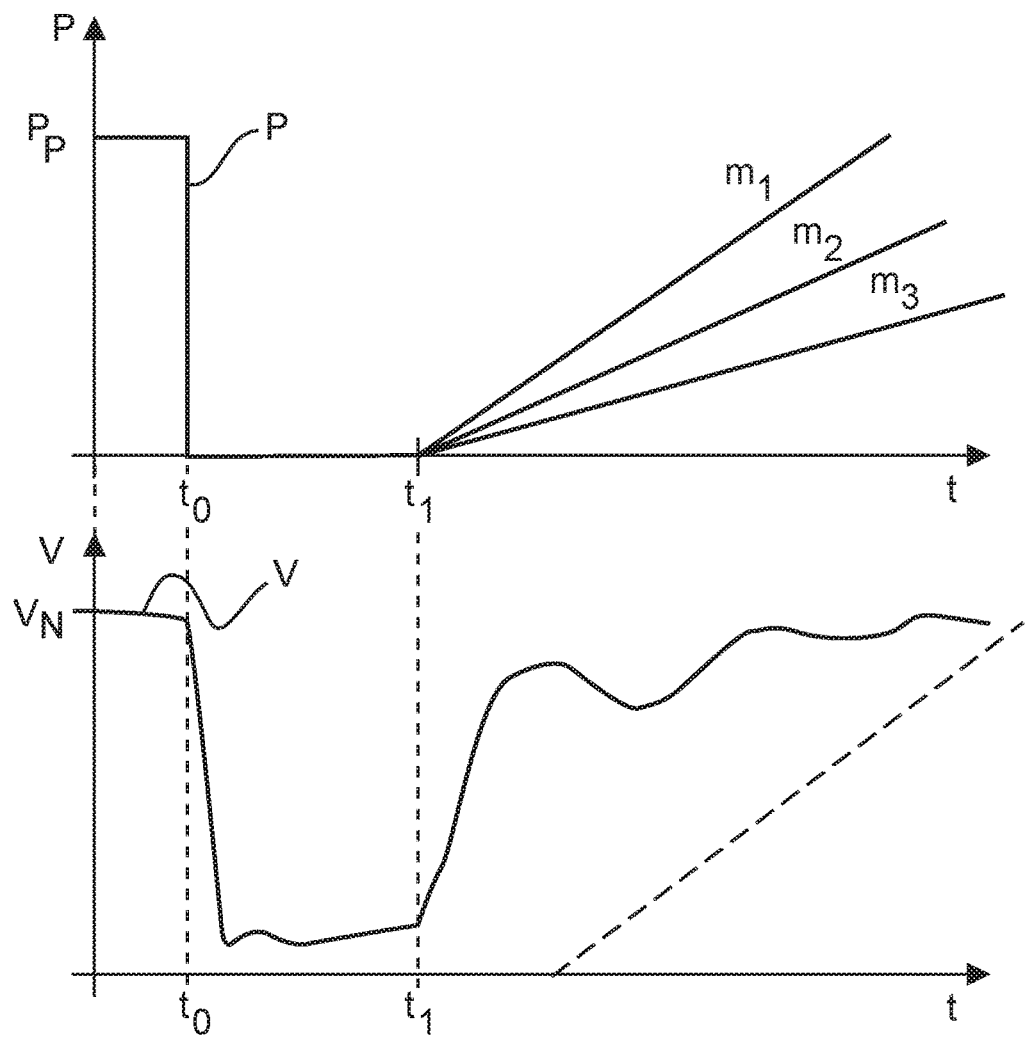
FIG. 9 shows, by way of illustration, a graph of a voltage recovery following a fault together with possible power control operations that may be performed using support control functions.

FIG. 9 shows two graphs that have the same time axis. The lower graph shows a voltage profile of the grid voltage V over time t, during and following a grid fault. The grid fault occurs at around the time $t0$ and is considered to have ended at the time $t_1$. Prior to the grid fault, the grid voltage V has a nominal voltage of around $V_N$ and then drops to a lower value, which may be for example 5% of the nominal voltage $V_N$. The system, specifically in particular the electricity supply grid, then has to recover again starting from the end of the grid fault, that is to say starting from the time $t_1$, such that the voltage increases again starting from the time $t_1$ so as then to reach a stable value of $V=V_N$ as soon as possible.

One possible power profile of the fed-in active power P is illustrated in the upper graph. Accordingly, an active power for example prior to the grid fault is fed in with the amplitude $P_P$ until the time $t_0$, which amplitude then drops to zero upon the grid fault. Following or starting from the end of the grid fault at the time $t_1$, the fed-in active power P then increases. This increase is performed by a support control function, which may for example predefine a gradient m of this active power increase. The gradient may depend on various criteria, as has been described above with regard to embodiments of the method according to the disclosure. By way of example, the incline may depend on a converter proportion in the electricity supply grid. This is illustrated in FIG. 9 by three different gradients $m_1$, $m_2$ and $m_3$ with respect to time. The support control function may thus for example be selected from a plurality of predefined functions that each have one of the gradients.

It also however comes into consideration for the gradients $m_1$, $m_2$ or $m_3$ mentioned by way of example to be set as parameters instead of selecting between a plurality of predefined functions. In any case, the support control function is selected or set such that an oscillation caused by the synchronous generator is counteracted. This is achieved here through the appropriate gradient.

Figure 10:
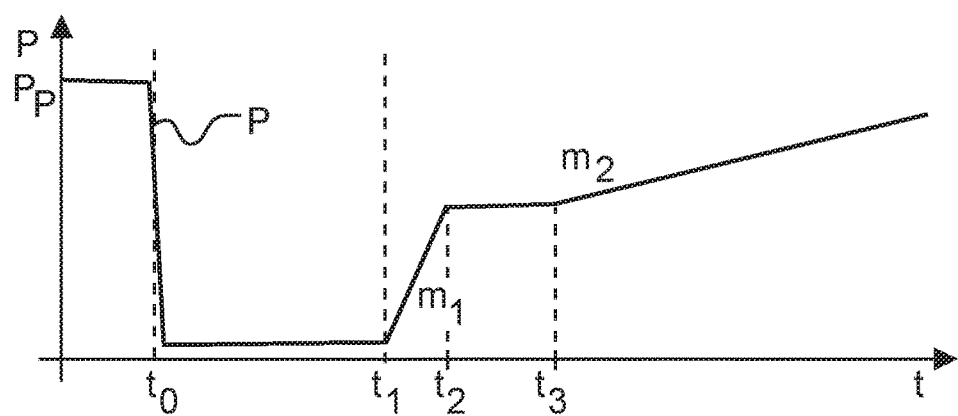
FIG. 10 shows a further illustrative possibility for a support control function for use following a grid fault.

It is however also possible for the support control function to be more complex than the one indicated in illustrative FIG. 9. A further example in this respect is shown in FIG. 10. FIG. 10 is based on the same starting situation as FIG. 9 and also uses the same time axis.

It is however then proposed for the support control function to have different gradients $m_1$ and $m_2$. This is illustrated in FIG. 10, accordingly starting from or following the end of the grid fault at the time $t_1$, the active power is first of all increased at the first gradient $m_1$, that is to say it is increased by a ramp with the gradient $m_1$. At the time $t_2$, according to this example, it is proposed for the fed-in power P to be kept constant for a predefined duration, specifically until the time $t_3$. Starting from the time $t_3$, the fed-in power P is then increased at a second gradient $m_2$ that is less than the first gradient $m_1$ in the example shown. As a result, an oscillation, in particular an upswing in an oscillation in the electricity supply grid, is able to be counteracted with appropriate parameterization, and it is possible to work toward a stable operating point. The initial rapid increase in the active power may in particular be used to reach a first operating point with a large amount of fed-in active power, whereas the second slower rise is able to achieve or promote oscillation calming.

It should be borne in mind that said gradients of FIGS. 9 and 10 may be different in spite of the same reference ($m_1$ and $m_2$). In both examples, that is to say FIGS. 9 and 10, there is however in principle provision for the power to then reach the power $P_P$ that was fed in before the grid fault again, provided that other boundary conditions, such as for example a subsidence of the wind in the meantime, do not go against this.

The invention claimed is:

1. A method for exchanging, at a grid connection point, electric power with an electricity supply grid that has a grid frequency using a wind power installation or a wind farm, the method comprising:
    exchanging the electric power depending on a control function, wherein the electric power includes active power and reactive power;
    controlling, by the control function, the electric power depending on at least one state variable of the electricity supply grid;
    permitting switching between a normal control function and a support control function, different from the normal control function, as the control function;
    determining that the electricity supply grid is operating stably;
    using the normal control function when it is determined that the electricity supply grid is operating stably;
    detecting a grid fault or an end of the grid fault;
    using the support control function when the grid fault or the end of the grid fault is detected, wherein:
        the support control function controls fed-in power to counteract an oscillation, in the electricity supply grid, of a synchronous generator connected to the electricity supply grid or caused by the synchronous generator; and
    using the support control function as the control function in post-fault behavior, wherein the post-fault behavior is a voltage recovery at the grid connection point following a voltage drop at the grid connection point.

2. The method as claimed in claim 1, wherein the support control function is configured to counteract the oscillation resulting from a response of at least one synchronous generator, coupled directly to the electricity supply grid, to the grid fault or the end of the grid fault.

3. The method as claimed in claim 1, comprising:
    storing a plurality of predefined functions; and
    selecting the support control function from the stored plurality of predefined functions based on a selection signal that is received externally.

4. The method as claimed in claim 1, comprising:
    setting the support control function or parameters of the support control function are set.

5. The method as claimed in claim 4, comprising:
    setting the support control function or parameters of the support control function externally via a data interface; or
    receiving the support control function from an external source.

6. The method as claimed in claim 1, comprising:
    selecting or setting the support control function depending on topology information; and
    selecting the topology information from a list including:
        one or more switch positions in the electricity supply grid, wherein the one or more switch positions are grid disconnection switches usable for disconnecting or connecting grid sections of the electricity supply grid, and information about connected generators, wherein the information includes dominant types of generations in the electricity supply grid.

7. The method as claimed in claim 6, comprising:
selecting the support control function depending on an evaluation result of predetermined evaluation logic.

8. The method as claimed in claim 1, comprising:
determining converter saturation that is a measure of a proportion of power fed in by converter-controlled feeders to power fed in by synchronous machines coupled directly to the electricity supply grid, wherein the converter saturation is associated with the electricity supply grid, a subsection of the electricity supply grid, or a nearby region defined around the grid connection point; and
setting or selecting the support control function depending on the determined converter saturation.

9. The method as claimed in claim 1, wherein:
the support control function controls an active power component and a reactive power component and an active power function and a reactive power function are provided,
the active power component achieves a first support task that is frequency support,
the reactive power component achieves a second support task that is voltage support, and
the first support task and the second support task are prioritized depending on a determined converter saturation for selecting or setting the support control function.

10. The method as claimed in claim 9, comprising:
selecting a ratio of the active power component to the reactive power component or a ratio of a rise in the active power component to a rise in the reactive power component depending on the determined converter saturation, wherein the ratio of the active power component to the reactive power component or the ratio of the rise in the active power component to the rise in the reactive power component is positively correlated with the determined converter saturation.

11. The method as claimed in claim 1, wherein the support control function specifies at least one of the following relationships or properties:
a temporal profile of the active power to be fed in or to be additionally fed in,
a temporal profile of a voltage to be impressed,
a relationship between a recorded grid voltage or grid voltage change and the reactive power to be fed in or to be additionally fed in or a reactive current to be fed in or to be additionally fed in,
a temporal profile of the reactive power to be fed in or to be additionally fed in or of the reactive current to be fed in or to be additionally fed in,
a temporal increase in the active power to be fed in or an active current to be fed in using a first ramp function with a predetermined gradient or using a plurality of combined ramp functions with different gradients or using a predetermined trajectory,
a temporal increase in the reactive power to be fed in or the reactive current to be fed in using a second ramp function with a predetermined gradient or using a plurality of combined ramp functions with different gradients or using a predetermined trajectory, at least one starting value of a time at which feeding-in is resumed following the grid fault or the end of the grid fault, a holding value of the active power or of the active current and/or of the reactive power or of the reactive current that specifies a value to which the active power or the active current and/or the reactive power or the reactive current is ramped up following the at least one starting value and remains unchanged for a predetermined duration, and a gradient that specifies a flank for the temporal profile of the active power or the active current and/or the reactive power or the reactive current from the at least one starting value to the holding value, and
a trigger voltage that specifies a voltage value or a value of a voltage change at which the end of the grid fault is detected after recovery following the grid fault or the end of the grid fault.

12. The method as claimed in claim 1, comprising:
using a multi-variable function as the support control function that is selected from:
the reactive power or a reactive current as a function of time and a grid voltage or a grid voltage change,
the active power or an active current as a function of time and the grid voltage or the grid voltage change,
the active power or the active current as a function of time and the grid frequency or a grid frequency change, and
the reactive power or the reactive current as a function of time and a fed-in active power and the grid voltage or the grid voltage change, wherein the support control function includes a plurality of multi-variable functions.

13. The method as claimed in claim 1, wherein:
information or parameters for selecting or setting the support control function are received externally before a grid problem or the grid fault occurs, and
the information or parameters are received by the wind power installation or wind farm unit at predetermined time intervals, individually changing time intervals or following a change in contents of the information or parameters.

14. A wind power installation, wind farm, electrical energy store or combination thereof, wherein the wind power installation, wind farm, electrical energy store or combination is converter-controlled, for exchanging electric power with an electricity supply grid that has a grid frequency at a grid connection point, comprising:
a converter configured to exchange the electric power depending on a control function, wherein the electric power includes active power and reactive power; and
a controller configured to control the exchange of the electric power using the control function, wherein the control function controls the electric power depending on at least one state variable of the electricity supply grid, and wherein the controller is configured such that:
switching between a normal control function and a support control function, different from the normal control function, as the control function is permitted,
the normal control function is used when it has been determined that the electricity supply grid is operating stably, and
the support control function is used when a grid problem, grid fault or an end of the grid fault has been detected,
wherein:
the support control function controls fed-in power to counteract an oscillation in the electricity supply grid of a synchronous generator connected to the electricity supply grid or caused by the synchronous generator, and the support control function is used as the control function in post-fault behavior, wherein the post-fault behavior is a voltage recovery at the grid connection point following a voltage drop at the grid connection point.

15. The wind power installation, wind farm, electrical energy store or combination as claimed in claim 14, comprising:

a data interface configured to receive information or parameters externally in order to select or set the control function.

* * * * *